(12) United States Patent  
Groenewald

(10) Patent No.: US 9,776,805 B2
(45) Date of Patent: Oct. 3, 2017

(54) LINEAR MOTION CONVEYOR

(71) Applicant: Eugene Groenewald, Woerden (NL)

(72) Inventor: Eugene Groenewald, Woerden (NL)

(73) Assignee: Key Technology, Inc., Walla Walla, WA (US)

( * ) Notice: Subject to any disclaimer, the term of this patent is extended or adjusted under 35 U.S.C. 154(b) by 16 days.

(21) Appl. No.: 14/818,129

(22) Filed: Aug. 4, 2015

(65) Prior Publication Data

US 2015/0336745 A1    Nov. 26, 2015

Related U.S. Application Data

(63) Continuation-in-part of application No. 13/892,519, filed on May 13, 2013, now Pat. No. 9,126,765.

(51) Int. Cl.
*B65G 27/20* (2006.01)
*B65G 27/30* (2006.01)
*B65G 27/32* (2006.01)
*B65G 27/12* (2006.01)
*B65G 27/28* (2006.01)

(52) U.S. Cl.
CPC ............ *B65G 27/20* (2013.01); *B65G 27/12* (2013.01); *B65G 27/28* (2013.01); *B65G 27/30* (2013.01); *B65G 27/32* (2013.01)

(58) Field of Classification Search
None
See application file for complete search history.

(56) References Cited

U.S. PATENT DOCUMENTS

| 2,669,344 | A | | 2/1954 | Flint |
| 4,339,029 | A | | 7/1982 | Wilson |
| 5,794,757 | A | * | 8/1998 | Svejkovsky ........... B65G 27/12 198/750.1 |
| 5,934,446 | A | | 8/1999 | Thomson |
| 5,979,640 | A | | 11/1999 | Horton |
| 6,079,548 | A | | 6/2000 | Svejkovsky et al. |
| 6,398,013 | B1 | | 6/2002 | Svejkovsky et al. |
| 6,415,911 | B1 | | 7/2002 | Svejkovksy et al. |
| 6,415,912 | B1 | | 7/2002 | Tamlin |
| 7,216,757 | B1 | | 5/2007 | Patterson et al. |
| 7,416,658 | B2 | | 8/2008 | Hur |

(Continued)

OTHER PUBLICATIONS

International Search Report for PCT Application PCT/US2016/040971, dated Sep. 30, 2016, Key Technology, Inc. "Linear Motion Conveyor", 21 pages.

(Continued)

*Primary Examiner* — Kavel Singh
(74) *Attorney, Agent, or Firm* — Randall Danskin P.S.

(57) ABSTRACT

A linear motion conveyor is described and which includes an elongated conveyor bed having a product transporting surface for supporting and transporting a product between the opposite first and second ends thereof, and a drive assembly oriented in force transmitting relation relative to the elongated conveyor bed, and where the elongated conveyor bed, when reciprocated by the drive assembly is operable to move product alternatively between the opposite ends of the product elongated conveyor bed in a first direction; a second direction; and which is further rendered operable to substantially stop the movement of the product located between the opposite ends of the elongated conveyor bed.

15 Claims, 16 Drawing Sheets

(56) References Cited

U.S. PATENT DOCUMENTS

| | | |
|---|---|---|
| 7,650,986 B2 | 1/2010 | Kwasniewicz |
| 7,975,835 B2 | 7/2011 | Pax |
| 8,066,114 B2 | 11/2011 | Svejkovsky et al. |
| 2001/0047925 A1 | 12/2001 | Sullivan, Jr. |
| 2003/0226742 A1* | 12/2003 | Didion .................. B65G 27/08 198/752.1 |
| 2004/0251113 A1 | 12/2004 | Tamlin |
| 2011/0083944 A1 | 4/2011 | Bonn |
| 2013/0048470 A1 | 2/2013 | Knodell, Jr. et al. |
| 2014/0332351 A1 | 11/2014 | Groenewald et al. |

OTHER PUBLICATIONS

Notification of the Transmittal of International Preliminary Report on Patentability, Jul. 14, 2017.

* cited by examiner

LINEAR MOTION CONVEYOR

RELATED APPLICATIONS

This utility patent application is a Continuation in Part (CIP) of prior filed and currently pending U.S. application Ser. No. 13/892,519 titled LINEAR MOTION CONVEYOR filed on May 13, 2013 by at least one of the same inventors, Eugene Groenewald. The entire contents of the aforementioned prior filed U.S. application Ser. No. 13/892,519 is expressly incorporated herein by this reference.

TECHNICAL FIELD

The present invention relates to a linear motion conveyor, and more specifically to a linear motion conveyor having a drive assembly which may be readily and selectively adjusted so as to impart motion to a product being transported by the linear motion conveyor, in opposite first and second directions, or to further stop the motion of product along the linear motion conveyor.

BACKGROUND OF THE INVENTION

Various conveying arrangements and devices have been devised and employed through the years for conveying products of various types along predetermined courses of travel between work stations. These various types of conveyors have included reciprocating conveyors, shuffle conveyors, vibratory conveyors, or shaking conveyors. Further, linear motion conveyors have been developed, and which are considered by some users to be operationally distinguishable from the other mentioned types of conveyors.

In this regard, linear motion conveyors or what are sometimes referred to "differential impulse" conveyors include a generally elongated, horizontal tray or pan having a planar surface for transporting goods thereon, During operation of these linear motion conveyors, the tray is moved slowly forward to convey the goods with respect to the tray, and then is pulled rearwardly at a higher return speed so that the goods slide along the tray. The prior art acknowledges that one of the significant advantage of these linear motion conveyors is that fragile goods which are being transported on same may move along in a manner that does not tend to damage them because the products do not roll or tumble or move out of contact with the underlying conveying surface.

Various types of linear motion conveyors have been taught in the art. The Office's attention is directed to U.S. Pat. No. 5,794,757 to Svejkovsky et al. and which shows several forms of a preferred differential impulse conveyor, and method, and which is useful for transporting products. This reference is interesting because of the recited history surrounding the development of conveyors of this style. While this invention suggests that differential impulse conveyors have been preferred in applications such as food handling, and the like, the reality is that this industry segment has not widely embraced these types of conveyors because they have not achieved all the objectives that they claim they were able to produce. Further, such prior art conveyors have tended to generate much more noise, and vibration than what their advocates will readily admit. Typically, these vibrations have been transmitted into underlying supporting surfaces, floors or mezzanines upon which these conveyors were mounted.

Additionally, and because of the physical relationships which exist between the various parts of these prior art conveyors, such prior art conveying arrangements are not readily adjustable so as to provide different conveying speeds, directions of movement, or which further can be readily adjusted so as to either slow down or stop the movement of product along the linear motion conveyor in the event that problems in a production line work station which is located downstream from the linear motion conveyor would require such stoppage of the product motion.

While the prior art arrangements as disclosed in the aforementioned prior art patent, and other devices used in the art, have worked with some degree of success, an acute need has emerged to provide a conveyor arrangement which will allow a product transporting conveyor of the type, which will be described hereinafter, to move product along a given course of travel, and which further can be readily adjusted so as to change the direction or speed of movement of the product, or even stop the movement of the product along the conveying surface depending upon the needs of the user, and without stopping the operation of the invention.

A linear motion conveyor which operates in the manner, as described above, is the subject matter of the present device.

SUMMARY OF THE INVENTION

A first aspect of the present invention relates to a linear motion conveyor, which includes an elongated reciprocally movable conveyor bed having opposite first and second ends, and a longitudinal axis, and wherein the elongated conveyor bed further has a product transporting surface which supports a product for movement between the first and second ends of the elongated conveyor bed; and a drive assembly oriented in predetermined, force transmitting relation relative to the elongated conveyor bed, and which, when energized, imparts reciprocal motion to the elongated conveyor bed to effect the selective movement of the product along the product transporting bed in a first direction which extends between the first and second ends of the product transporting surface; a second direction which extends from the second end, to the first end of the product transporting surface; and which further substantially stops the movement of the product which is located between the first and second ends of the elongated conveyor bed, and wherein the drive assembly is carried on a stationary base which is located vertically below the elongated conveyor bed and the drive assembly further has a powering unit subassembly which is pivotally movable about a pivot axis which is carried by the stationary base and along and arcuate path of travel, and wherein the pivotal movement of the powering unit determines the selective movement of the product upon the product transporting surface.

Another aspect of the present invention relates to a linear motion conveyor which includes an elongated conveyor bed having opposite first and second ends, and a product transporting surface which supports a product for movement between the first and second ends of the elongated conveyor bed; a frame affixed to a stationary base and to the elongated conveyor bed, and wherein the frame renders the elongated conveyor bed reciprocally moveable relative to the stationary base, and wherein such reciprocal movement of the elongated conveyor bed effects the movement of the product along the product transporting surface; and a drive assembly coupled in force transmitting relation relative to the elongated conveyor bed, and which, when energized, transmits force to the elongated conveyor bed to move the elongated conveyor bed in a first direction, and in an opposing second direction, to cause the elongated conveyor bed to impart movement to the product along the product transporting surface, and wherein the drive assembly, when energized, is selectively positionally adjustable so as to further cause the product to move in a first direction, from the first to the second end; a second direction to cause the product to move from the second end to the first end; and a third position to substantially prohibit movement of the product between the first and second ends of the product transporting surface.

A still further aspect of the present invention relates to a linear motion conveyor which includes an elongated conveyor bed having opposite first and second ends, a top surface defining a product transporting surface which supports a product for movement between the respective opposite ends of the elongated conveyor bed, and a bottom surface, and wherein the elongated conveyor bed is supported in spaced relation relative to a stationary base; a frame having first, second, third and fourth spring legs which, moveably support the respective first and second ends of the elongated conveyor bed in spaced relation relative to the stationary base, and wherein each of the spring legs have a respective lower, or bottom end which is fixedly attached to the stationary base, and an opposite, upper, or top end, which is fixedly affixed to the elongated conveyor bed; a reciprocally moveable counter-weight mounted vertically below, and in spaced relation relative to the elongated conveyor bed, and which is further located between the first and second ends thereof; a selectively moveable drive assembly which is borne by a stationary base, and which is further located vertically below the reciprocally movable counterweight; a selectively energizable motor mounted on the drive assembly, and which further has an output shaft; a first axle mounted below, and transversely relative to the elongated conveyor bed, and which is further coupled in force receiving relation relative to the output shaft of the selectively energizable motor, and wherein the selectively energizable motor, when actuated, imparts rotational movement to the first axle; a first eccentric drive plate mounted on the first axle, and which is co-rotatable therewith, and wherein the first eccentric drive plate has a first, and an opposite, second side; a second axle mounted below, and transversely relative to the elongated conveyor bed, and which is further located in a substantially parallel and offset orientation relative to the first axle; a second eccentric drive plate mounted on the second axle, and which is co-rotatable therewith, and wherein the second eccentric drive plate has a first side, or portion, and an opposite, second side, portion or end; a first drive member having a first end which is eccentrically, rotatably coupled to the second axle, and an opposite, second end, which is coupled in force transmitting relation relative to the reciprocally moveable counter-weight, and wherein rotation of the second axle imparts reciprocal motion to the counter-weight; a second drive member having a first end which is eccentrically, rotatably couple to the second axle, and an opposite, second end, which is coupled in force transmitting relation relative to the elongated conveyor bed, and wherein rotation of the second axle imparts reciprocal motion to the elongated conveyor bed so as to cause the elongated conveyor bed to reciprocate at a given speed, and which is effective in moving the product along the product transporting surface; and a drive link rotatably coupling together the first and second drive plates, and wherein the rotation of the first axle by the energizing of the selectively energizable motor transmits rotational force to the second axle by way of the drive link, and further causes the generation of a predetermined amount of reciprocal, vibratory force which is imparted to the elongated conveyor bed by the simultaneous rotation of the first and second eccentric drive plates, and wherein the generated vibratory force, in combination with the reciprocal movement of both the counter-weight, and the reciprocal motion of the elongated conveyor bed effects the movement of the product along the product transporting surface, and wherein the drive assembly further includes a rotatably movable powering unit, wherein the selective positioning of the powering unit relative to the selectively movable drive assembly causes the elongated conveyor bed to selectively transport product along the product transporting surface in a first direction which extends from the first end to the second end; in a second direction which extends from the second end to the first end; and which further prohibits the movement of the product between the first and second ends of the elongated conveyor bed.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
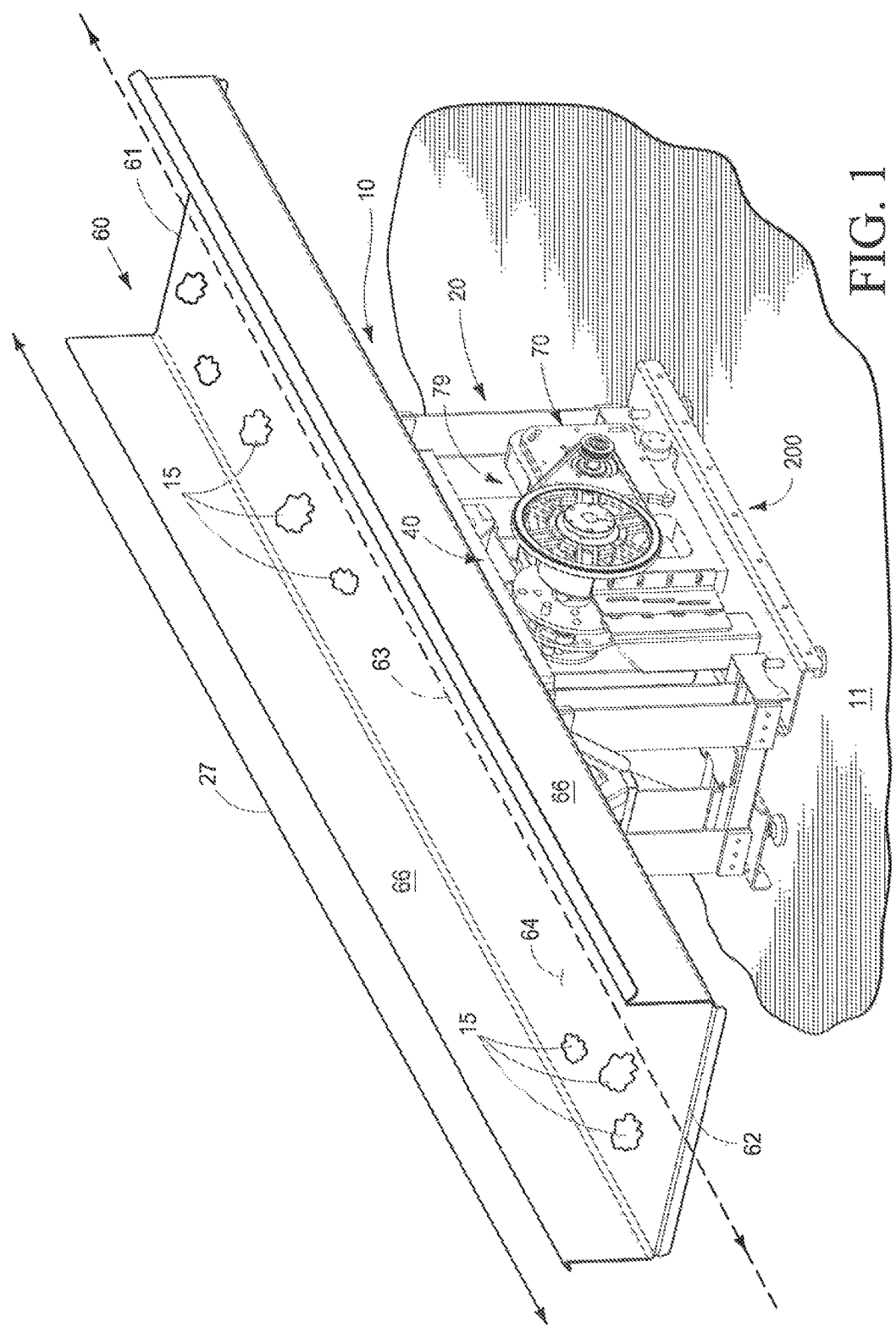
FIG. 1 is n isometric, top view of the improved linear motion conveyor of the present invention.

This disclosure of the invention is submitted in furtherance of the constitutional purposes of the U.S. Patent Laws "to promote the progress of science and useful arts" (Article 1, Section 8).

The improved linear motion conveyor of the present invention 10 generally comprises a stationary base 200, a drive assembly 79, a frame assembly 20, a counterweight 40, and an elongated conveyor bed 60.

The improved linear motion conveyor of the present invention is generally indicated by the numeral 10 in FIG. 1 and following. The invention 10 is supported on the stationary base 200 which, in turn, rests upon an underlying supporting surface which is generally indicated by the numeral 11. The underlying supporting surface may comprise a supporting floor of a factory, or other supporting surface located therebeneath.

Figure 3:
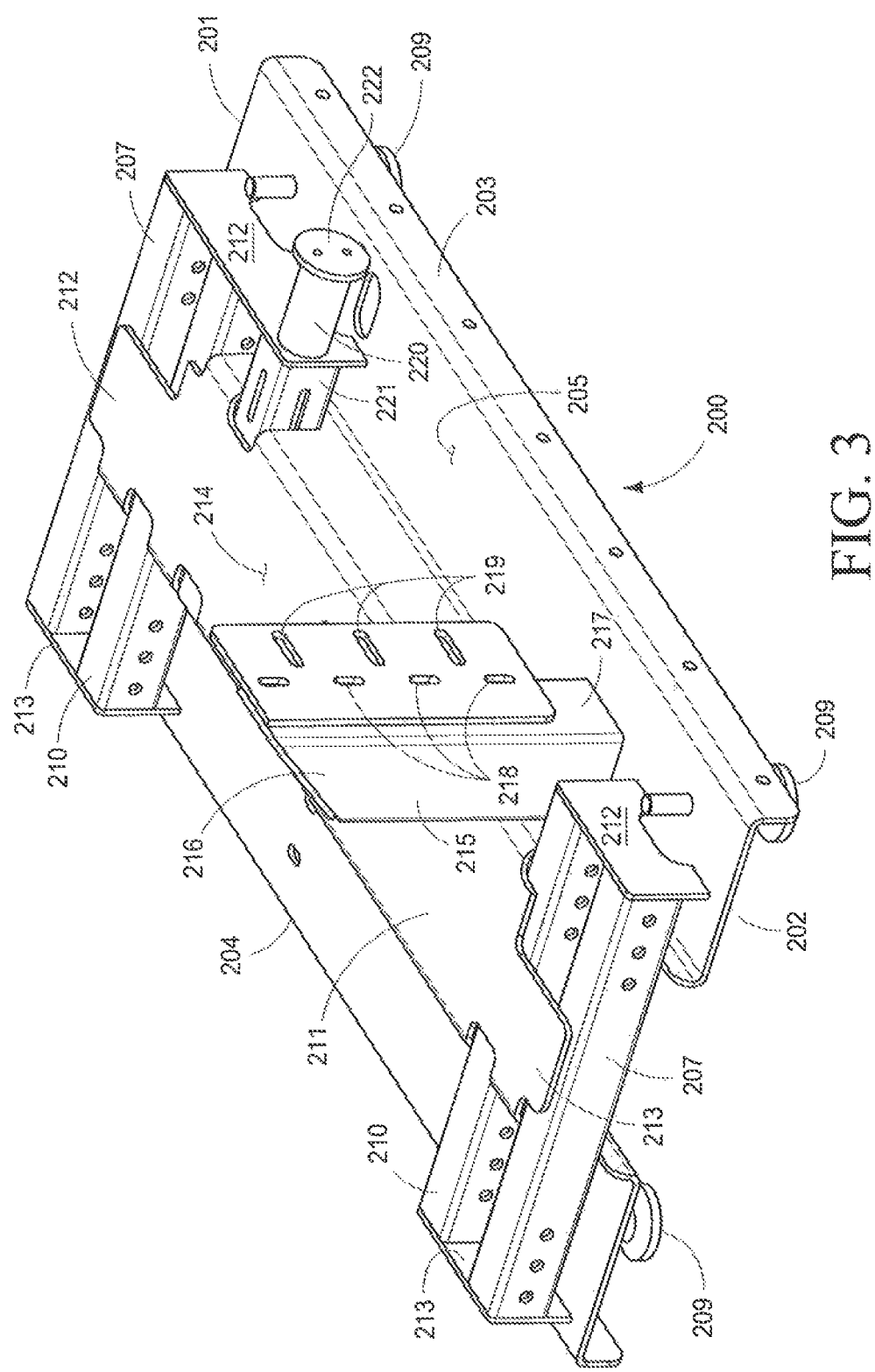
FIG. 3 is an isometric, top view of the stationary base and which is a feature of the present invention.
Figure 3A:
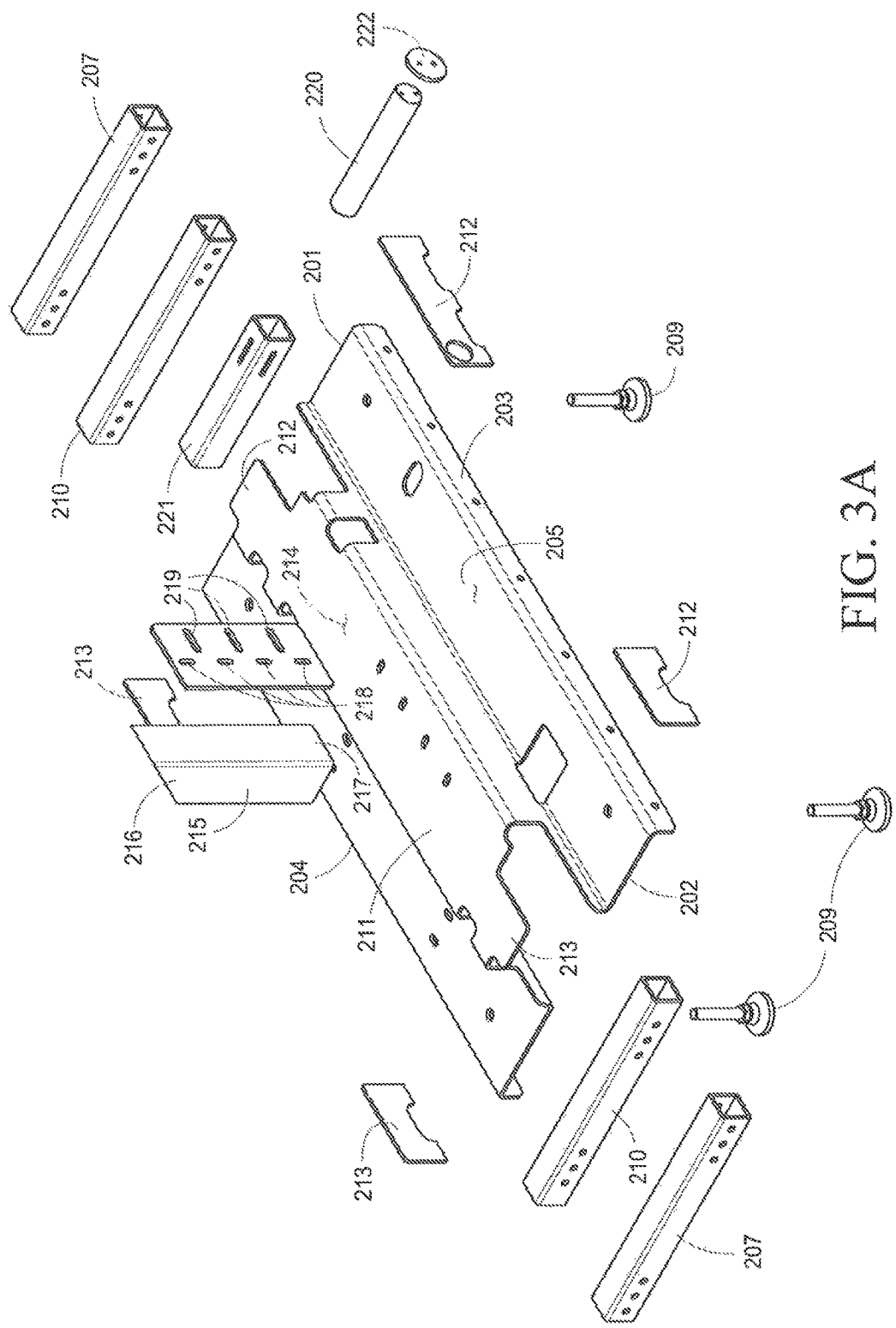
FIG. 3A is an isometric, exploded view of the stationary base as seen in FIG. 3.

The stationary base 200 (FIGS. 3, 3A) is generally rectilinear in configuration and has a first end portion 201; a second end portion 202; a first side portion 203; a second side portion 204; a top surface 205; and a bottom surface 206. The frame spring mounts 207 (FIG. 3) are formed of box beam members and are fixedly attached to the top surface 205 and are proximate to the first end, or portion 201, and proximate the second end, or portion 202 and extend transversely between the first side portion 203, and second side portion 204, respectively. A plurality of spaced and generally longitudinally aligned fastener holes are formed in each opposing end portion of the translation frame spring mounts 207, and which receive conventional fasteners 16. The fasteners secure the frame assembly 20 to the stationary base 200.

Counterweight spring mounts 210 (FIG. 3) are similarly formed of box beam members and which are fixedly attached to the top surface 205, and located proximate to the first end portion 201 and the second end portion 202, and inwardly of the translation frame spring mounts 207. These structures extend transversely between the first side portion 203 and the second side portion 204. A plurality of generally longitudinally aligned fastener holes are formed in each opposing end portion of the counterweight spring mounts 210, and receive conventional fasteners 16 which secure the counterweight 40 to the stationary base 200. A supporting surface or platform 211, and which includes end caps 212, 213 are structurally attached to and communicate between proximate end portions of the translation frame spring mounts 207 and the counterweight spring mounts 210, respectively. The end caps 212, 213 provide additional structural rigidity and maintain the spaced distance between the spring mounts 207, 210. A raised elongate platform 211 extends between the two spaced apart counterweight spring mounts 210 and is medially positioned between the first side 203 and the second side 204. The raised and elongated platform, or supporting surface 211 provides a planar surface 214 which carries and supports various subassemblies of the drive assembly 79 and which will be discussed, below.

A vertical motor mount 215 (FIG. 3) is structurally attached to the stationary base 200, and is spaced from the counterweight spring mount 210, and fixedly located approximate the second end 202. The vertical motor about 215 has a lower end 217 which is structurally attached to the top surface 205 of the stationary base 200; and an upper end 216 which is located distally from the top surface 205. A plurality of spaced and vertically elongated holes 218 and a plurality of spaced and horizontally elongated holes 219 are formed in the vertical motor mount 215. The elongated holes 218 and 219 provide a means for horizontal and vertical adjustment of a portion of the drive assembly 79 relative to the stationary base 200. As will be discussed, hereinafter the selective positioning of a portion of the drive assembly 79, relative to the stationary base 200 is effective in determining the frequency of oscillation of the elongated conveyor bed 60, and counterweight 40, and the resulting direction of movement of product 15 carried on a product transporting surface 64 of the elongated conveyor bed 60. (FIG. 1).

Figure 9:
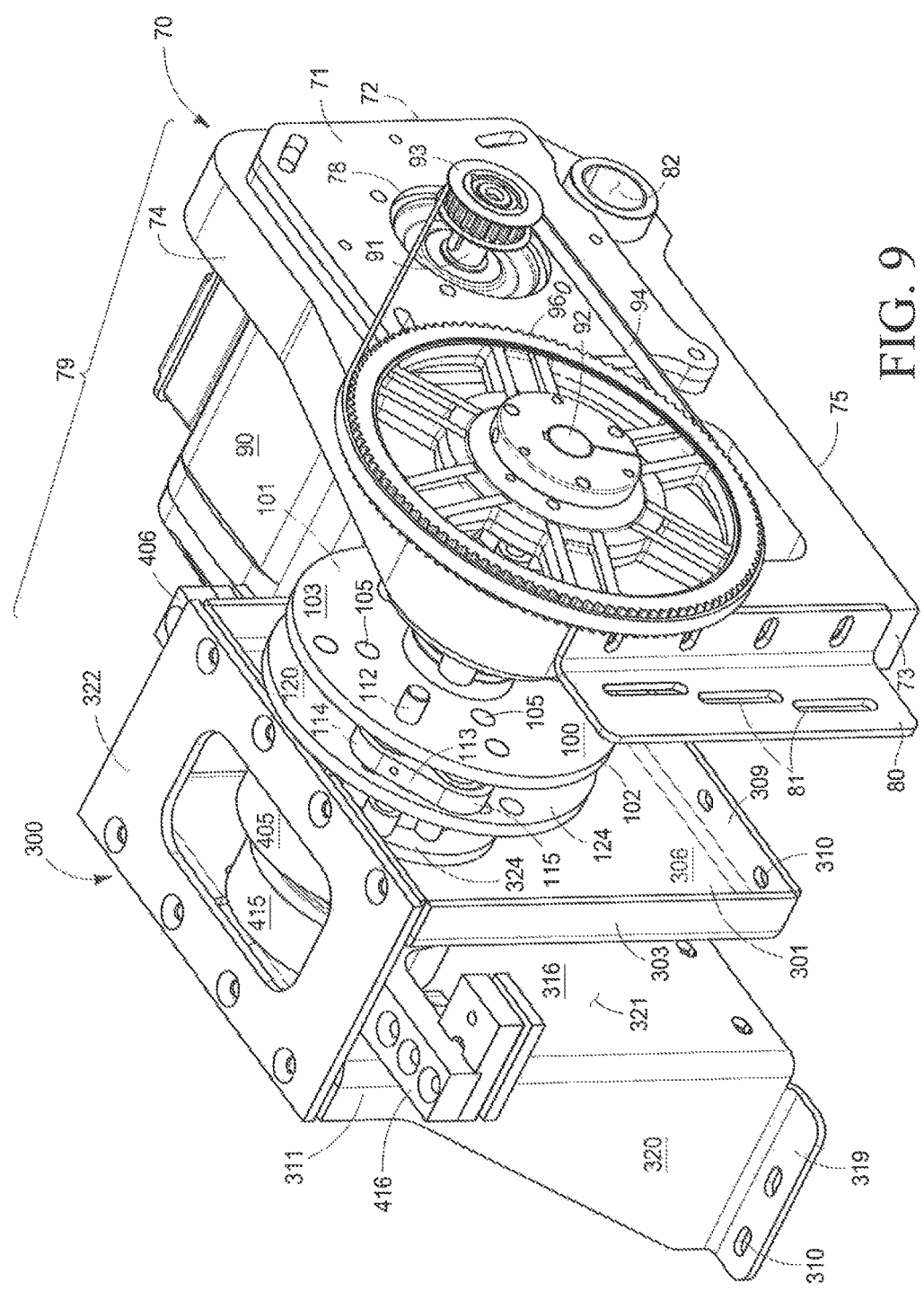
FIG. 9 is an isometric, top view of the drive assembly of the present invention.

A pivot axle 220 (FIG. 3) having a box beam sleeve 221, and a disk shaped end cap 222 is carried by the stationary base 200, and located inwardly relative to the counterweight spring mount 210, and proximate the first end 201, and the first side 203 respectively. The pivot axle 220 is generally cylindrical in shape, horizontally oriented, and extends transversely to the stationary base 200 and is partially, axially carried in a channel (not shown) and which is defined by the box beam sleeve 221. The pivot axle 220 provides a pivot point for rotational movement of a powering unit 70 (FIG. 9), and which is a subassembly of the drive assembly 79. As noted previously, the stationary base 200 is supported on an underlying supporting surface 11. A plurality of spaced leveling feet 209 which communicate with the bottom 206 (FIG. 2) of the stationary base 200 provide a means for precisely leveling the invention 10 in its operating environment. The precise leveling of the invention 10 is important because inclines, declines, slants and the like of the invention 10 will affect product 15 movement on the product transporting surface 64.

Figure 4:
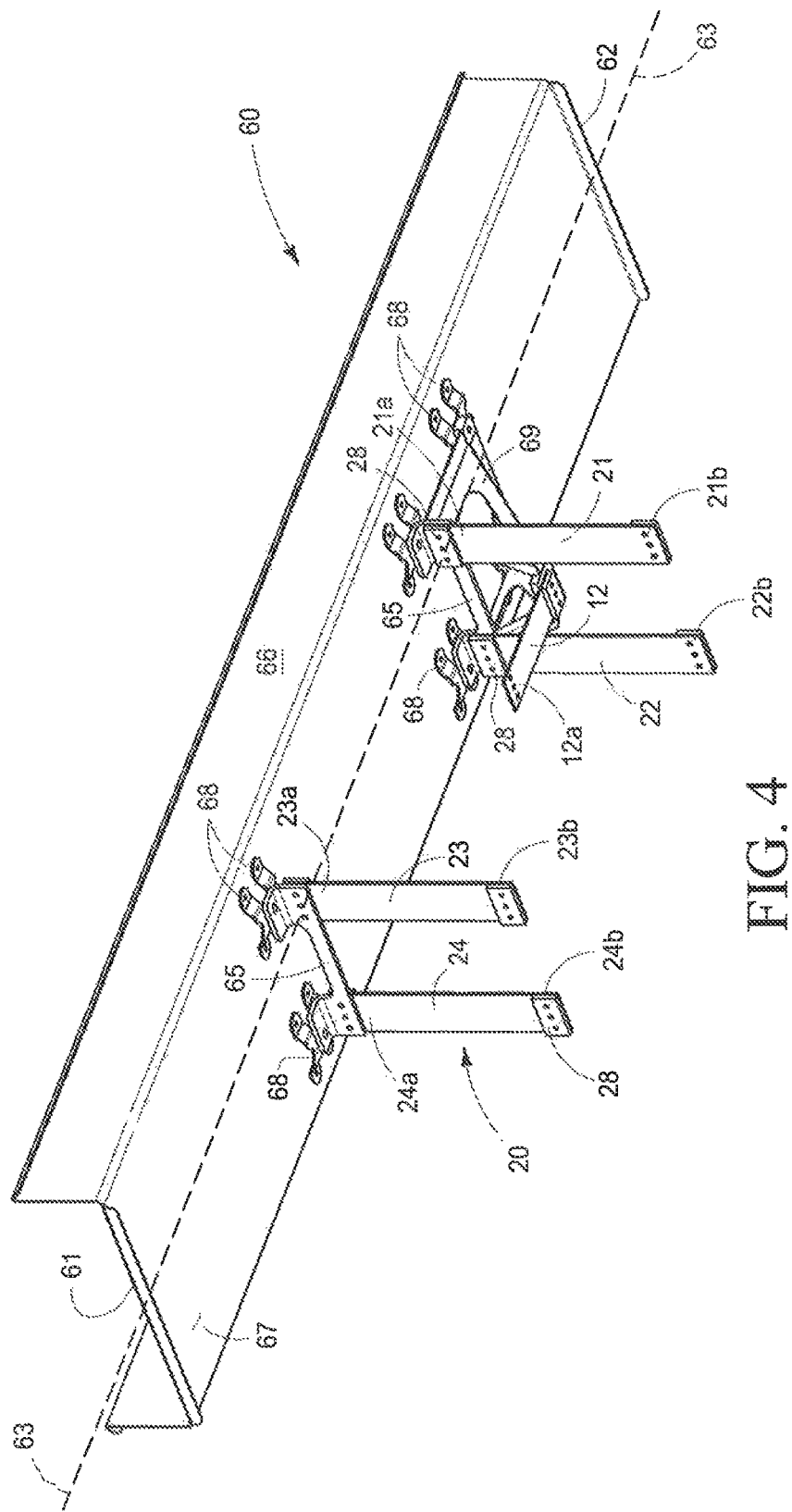
FIG. 4 is an isometric, bottom view of the elongated conveyor bed and which is a feature of the present invention.
Figure 5:
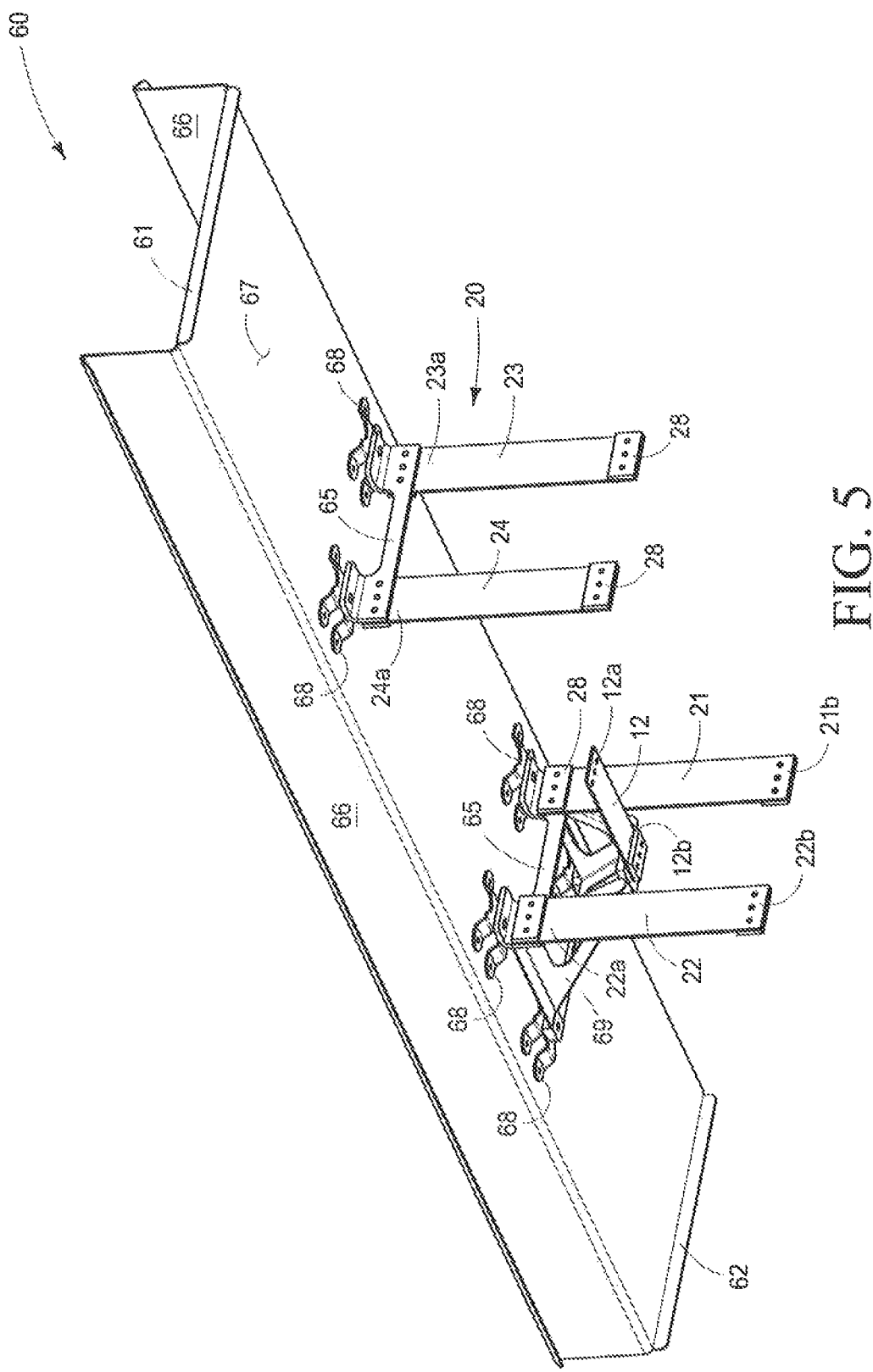
FIG. 5 is an isometric, bottom view of the elongated conveyor bed of FIG. 4 and which is rotated about 180°.
Figure 14:
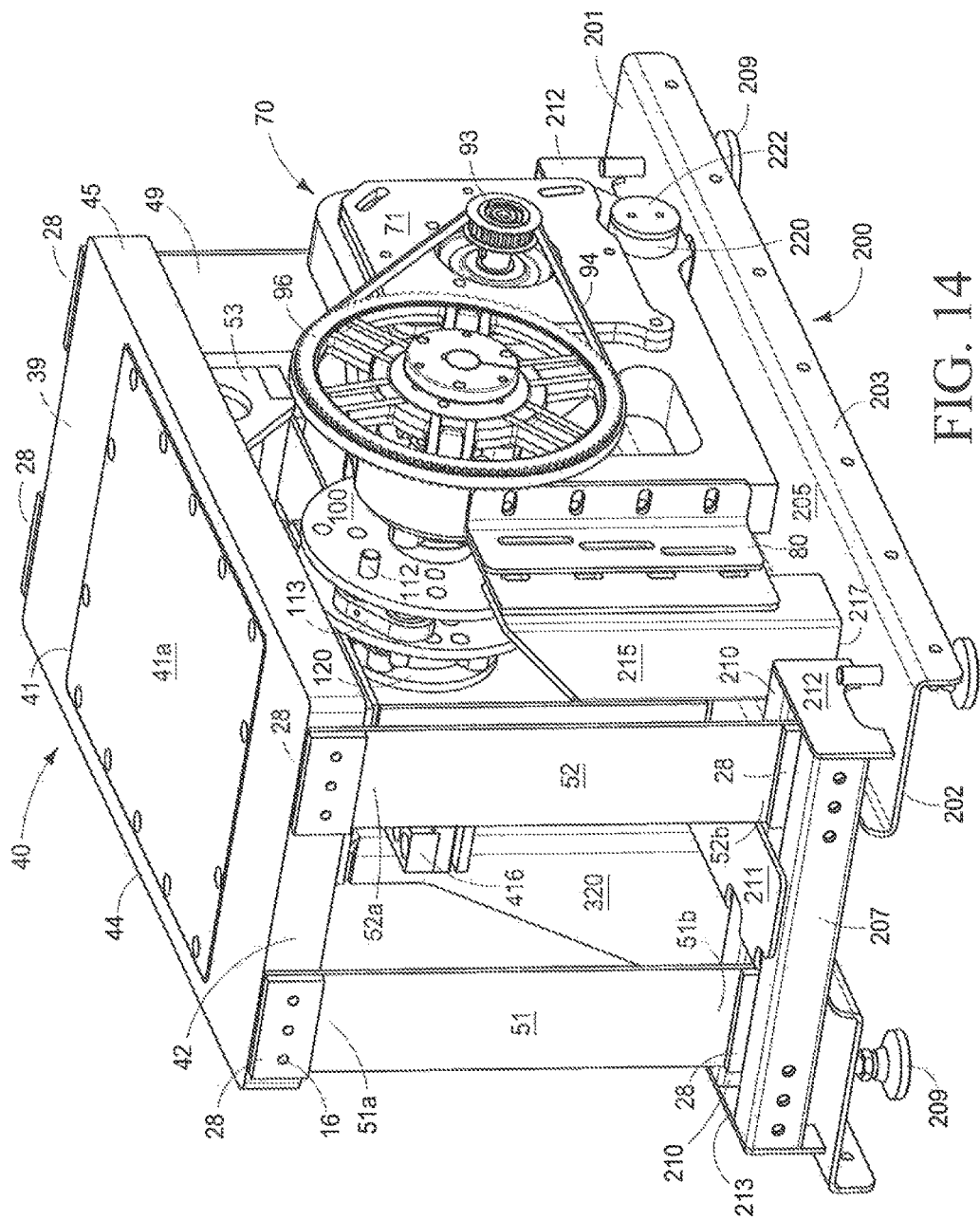
FIG. 14 is an isometric, top view of the stationary base carrying the drive assembly and the counterweight, and showing the relationship of the components to one another.

The frame assembly 20 is generally indicated by the numeral 20 (FIGS. 4, 5) and communicates between the stationary base 200, and the elongated conveyor bed 60. The frame 20 facilitates substantially parallel movement of the elongated conveyor bed 60 although it is recognized movement of the elongated conveyor bed 60 upon the translation frame 20 includes some minor component of vertical movement which is anticipated to be less than approximately 2% of the amount of horizontal movement. The translation frame 20 includes a first spring leg 21; a second spring leg 22; a third spring leg 23; and a fourth spring leg 25. Each of the respective spring legs 21, 22, 23, 24 has a lower/bottom or first end which is located proximate the stationary base 200, and which is designated by the letter "b" (21b, 22b, 23b, 24b); and an upper/top or second end which is located proximate to the elongated conveyor bed 60, and which is designated by the letter "a" (21a, 22a, 23a, 24a). Each of the respective spring legs 21, 22, 23, 24 is formed of a spring steel, or more commonly a synthetic composite such as, but not limited to, laminated fiberglass, carbon fiber, or the like. The respective spring legs 21, 22, 23, 24 are strong, resilient, durable and resistant to torsion/twisting forces so as to impede any "yawing" motion of the elongated conveyor bed 60 during operation. Each of the respective spring legs 21, 22, 23, 24 are spaced apart from the other legs, and are substantially parallel to the others. The respective spring legs 21, 22, 23, 24 provide an interconnection between the stationary base 200, and the elongated conveyor bed 60. The length of the respective spring legs 21, 22, 23, 24 from the upper/top end 21a, 22a, 23a, 24a, to the lower/bottom end 21b, 22b, 23b, 24b positionally maintains the elongated conveyor bed 60 in a predetermined spaced relationship above the stationary base 200. Each of the respective spring legs 21, 22, 23, 24 defines plural fastener holes (not shown) in each opposing end portion (a, b) for cooperation with a conventional fastener 16. The fasteners pass through the respective spring legs so as to secure the respective spring legs 21, 22, 23, 24 to the spring mounts 207 which are mounted on the stationary base 200 respectively and to the elongated conveyor bed 60. Reinforcing plates 28 (FIG. 2) define fastener holes (not shown) that align with the fastener holes (not shown) and which are formed in the opposing end portions (a, b) of the spring legs 21, 22, 23, 24. These fastener holes are used to reinforce the attachment of the lower/bottom ends 21b, 22b, 23b, 24b of the spring legs to the spring mounts 207 of the stationary base 200. This arrangement also reinforces the spring leg upper/top ends 21a, 22a, 23a, 24a to the transverse spring leg mounts 65, and which are carried on a bottom surface 67 of the elongated conveyor bed 60, (FIG. 5). The reinforcing plates 28, along with conventional fasteners 16, fixedly "sandwich" the respective spring leg 21, 22, 23, 24 ends (a, b) to the spring leg mounts 65 (FIG. 5), and the frame spring mounts 207. (FIG. 14). The interconnection of the respective spring leg 21, 22, 23, 24 ends (a, b) to the elongated conveyor bed 60, and to the stationary base 200 eliminate any "pivotal" interconnection therebetween. The fixed interconnection of the respective spring legs 21, 22, 23, 24 to the elongated conveyor bed 60, and the stationary frame 200 eliminates the need for bearings at the interconnections, and also reduces wear, and tear and the maintenance which is necessary to support the movable elongated conveyor bed 60. Further, the fixed interconnection of the respective spring legs 21, 22, 23, 24 relative to the elongated conveyor bed 60, and the stationary base 200 provides for a substantially continuous tension to be generated as the elongated conveyor bed 60 is moved from a first position 25, (FIG. 15) to a second position 26 (FIG. 15) along a longitudinal axis 63 of the elongated conveyor bed 60. This reciprocal movement imparts predetermined movement to the product 15 and which is carried on a product supporting surface 64. Further still, the use of the respective spring legs 21, 22, 23, 24 and the fixed interconnections has a tendency to reduce the noise of operation, and further reduce the overall mass of the invention 10. The reduction of noise is attributable, at least in part, to the removal of movable/pivotal interconnections (e.g. bearings) which necessarily have some amount of "play" to facilitate movement and which may be exacerbated after periods of use.

Figure 15:
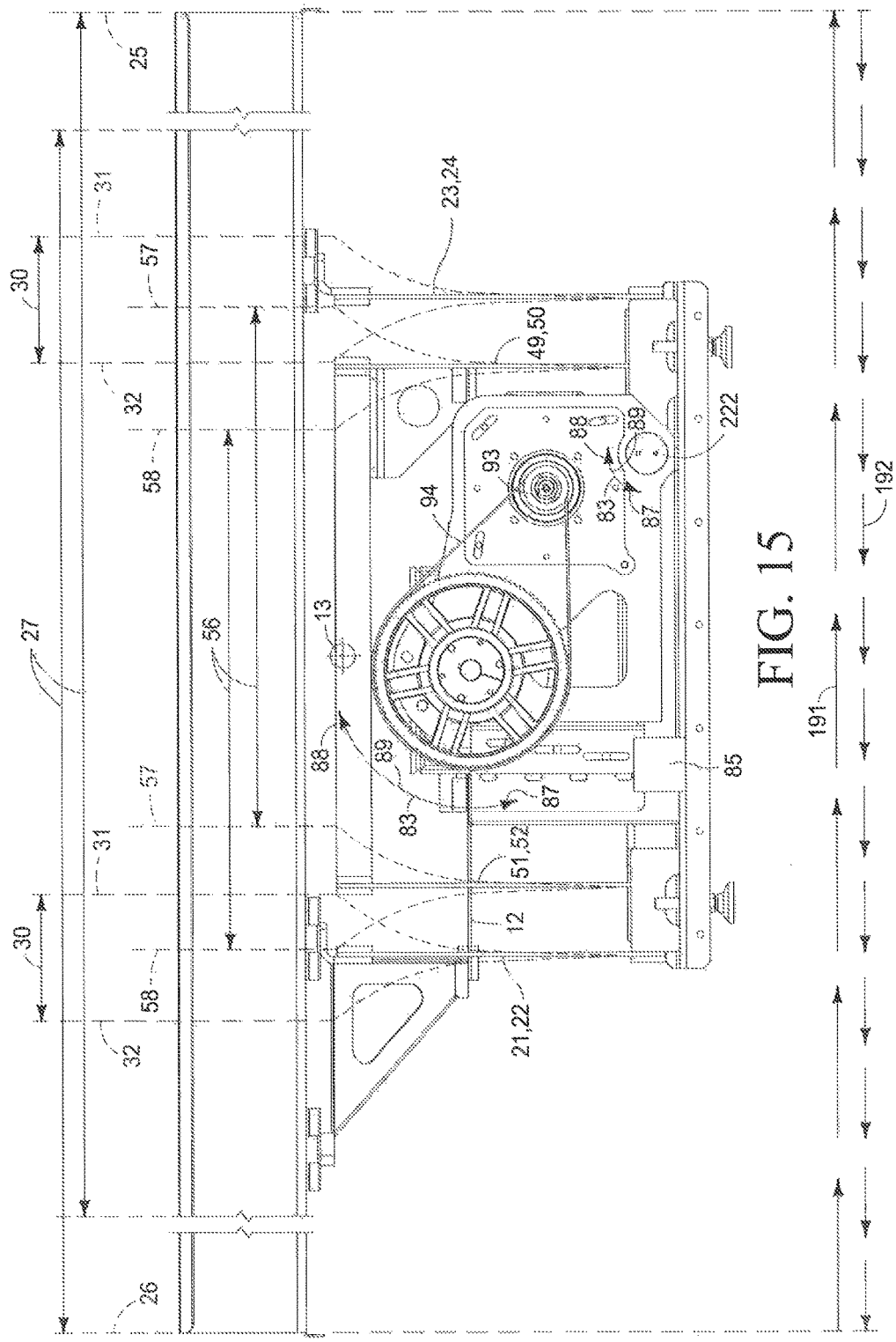
FIG. 15 is a partially schematic side elevation view of the improved linear motion conveyor of FIG. 1 and showing the movement of several components of the present invention in phantom lines.

The frame 20, (FIG. 4) and more specifically the top ends 21a, 22a, 23a, 24a of the spring legs 21, 22, 23, 24 are moveable along a predetermined reciprocal course of travel that is generally indicated by the numeral 30, (FIG. 15) The course of travel 30 is defined between a first, or forwardly directed position 31, (FIG. 15) and a second, opposite, and rearwardly located position 32. (FIG. 15). As will be discussed in greater detail in this application, the frame 20 is reciprocally moveable along this course of travel 30 at different velocities in order to achieve the benefits of the present invention.

The present invention 10 also includes a reciprocally moveable, and elongated conveyor bed which is generally indicated by the numeral 60. The elongated conveyor bed 60 has a first end 61, and an opposite second end 62. (FIG. 1). Still further, the elongated conveyor bed 60 is generally defined by a longitudinal axis which is indicated by the line labeled 63, The elongated conveyor bed 60 has a product transporting surface 64, which is operable to be reciprocally moved in opposite directions, and at varying velocities so as to cause a product 15, which is deposited on the product transporting surface 64, to move between the opposite first and second ends 61 and 62 in a predetermined manner. The elongated conveyor bed also has a pair of spaced, substantially vertically disposed sidewalls 66 which confine the product 15 on the product transporting surface 64. The elongated conveyor bed 60 also has a bottom surface 67. (FIG. 4).

Mounting brackets 68 (FIG. 4) are carried on the bottom surface 67, and are spacedly arrayed between the first and second ends 61 and 62, and located laterally inwardly relative to the spaced sidewalls 66. As will be recognized by a study of FIGS. 4 and 5, transverse spring leg mounts 65 interconnect with the mounting brackets 68, and also with the upper/top end portions 21a, 22a, 23a, 24a of the spring legs 21, 22, 23, 24. The upper/top ends 21a, 22a, 23a, 24a are fixedly attached with conventional fasteners 16, and reinforcing plates 28 to the transverse spring leg mounts 65. This arrangement renders the spring leg mounts irrotatable relative to the elongated conveyor bed 60, As noted previously, the lower/bottom ends 21b, 22b, 23b, 24b of the respective spring legs 21, 22, 23, 24 are fixedly attached to the spring leg mounts 207 of the stationary base 200 and are likewise thereby rendered substantially irrotatable relative to the stationary base 200.

Figure 6:
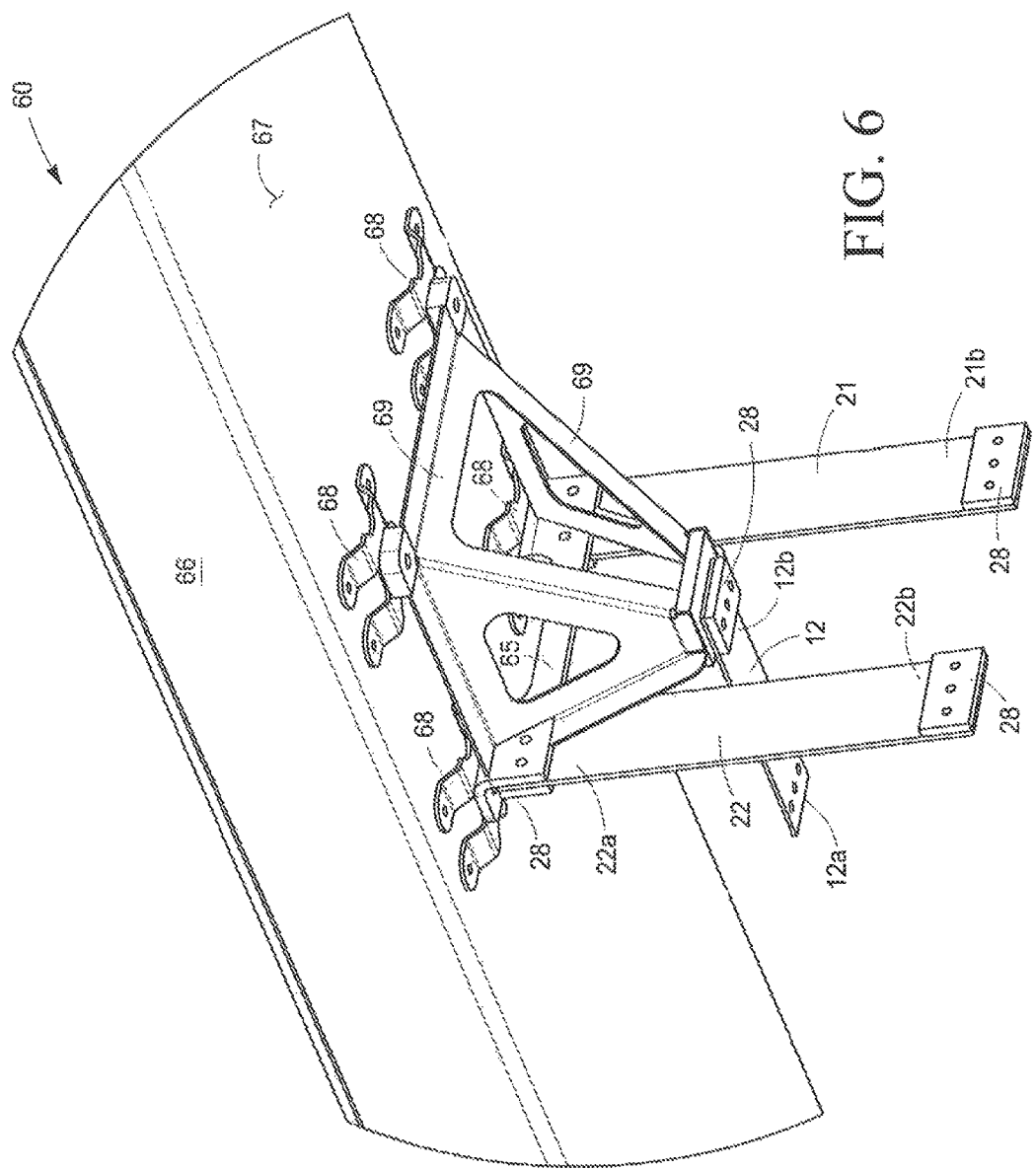
FIG. 6 is an enlarged, partial, fragmentary isometric view of the connecting frame of the elongated conveyor bed.

A drive frame 69 (FIG. 6) and which is formed of a plurality of interconnected beams, and struts, is carried on the bottom surface 67 of the elongated conveyor bed 60. The drive frame 69 is located in spaced relation relative to the second end portion 62, is and generally centrally positioned between the spaced apart sidewalls 66, The drive frame 69 carries a generally horizontal inwardly extending driver member 12 that interconnects with the eccentric drive unit 300, and which will be discussed in greater detail, hereinafter. The drive member 12 has a first end portion 12a that is proximate a medial portion of the elongated conveyor bed 60, and a second end portion 12b that is proximate to the second end 62. The drive member is formed of a flexible or resilient material which will allow t to flex about its longitudinal axis.

The present invention 10 includes a counter weight which is generally indicated by the numeral 40, (FIGS. 7, 8, 14) and which is carried in a location which is vertically, below, the elongated conveyor bed 60, and vertically above the drive assembly 79. The counter weight 40 generally comprises a slab weight frame 39; a slab weight 41; and individual spring legs 49, 50, 51, 52 respectively. The slab weight frame 39 is generally rectilinear in configuration and has a first end portion 42; a second end portion 43; a first side portion 44; a second side portion 45; a top 46; a bottom 47; and having a dimensional thickness 48. A medial cavity 41 is defined in the top 46 and releasably carries the slab weight 41a therein. The respective spring legs 49, 50, 51, and 52 are substantially similar in length, and width dimensions to each other, and further have an upper/top end portion designated by the letter "a", and a lower/bottom end portion designated by the letter "b". The respective spring legs 49, 50, 51 and 52 are located in predetermined, substantially parallel, spaced relation, relative to each other. The spring legs 49, 50, 51 and 52 are further located at the first end 42, and second end 43, and in the corners of the slab weight frame 39. The upper/top end portions 49a, 50a, 51a, 52a are fixedly attached to the slab weight frame 39 by conventional fasteners 16, and reinforcing plates 28 as earlier described. Additionally, the lower/bottom end portions 49b, 50b, 51b, 52b are fixedly attached to the counterweight spring mounts 210 of the stationary base 200 with reinforcing plates 28 and conventional fasteners 16. The fixed attachment of the respective spring legs 49, 50, 51, 52 to the slab weight frame 39, and to the counterweight spring mounts 210 positionally maintains the respective spring legs 49, 50, 51 and 52 in substantially parallel, spaced relation. The respective spring legs 49, 50, 51, 52 are preferably formed of a spring steel, or more commonly, of a known composite such as, but not limited to, laminated fiberglass, carbon fiber, or the like and which is strong, resilient, durable, and substantially resistant to torsion/twisting forces. This materially impedes "yawing" movement of the counterweight 40 during operation.

The slab weight 41 which provides various operational features of the present invention 10, is here illustrated as being a substantially rectilinear shaped main body having a predetermined weight. However, it will be recognized that other shapes would work with equal success, and the weight of the slab weight 41 may be adjusted by varying the thickness 48 or composition of the slab weight 41 without changing the length and width dimensions thereof, so that the slab weight 41 may be positionally maintained within the cavity (not shown) defined in the top 46 of the slab weight frame 39.

Figure 7:
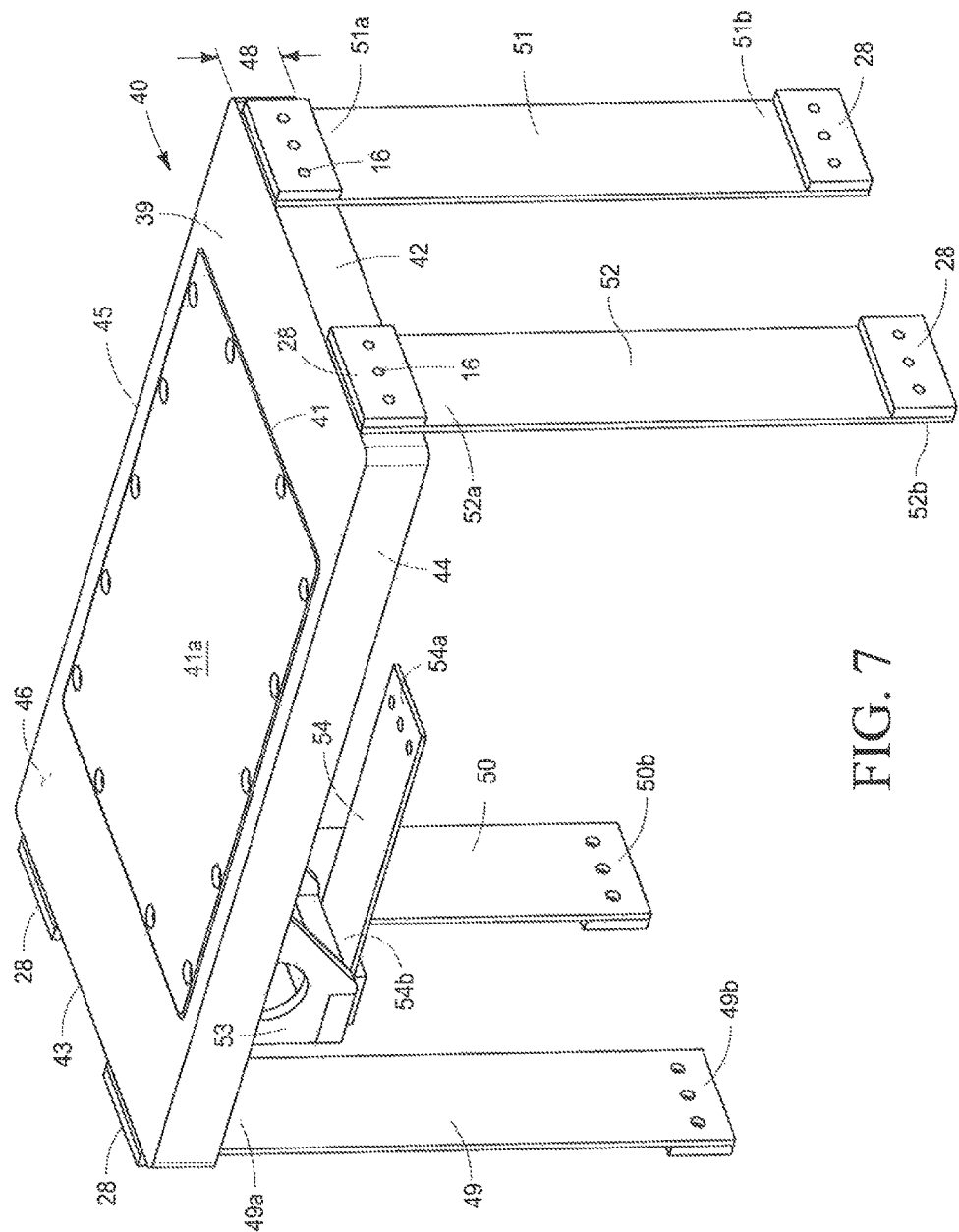
FIG. 7 is an isometric, top view of the counterweight which forms a feature of the present invention.
Figure 8:
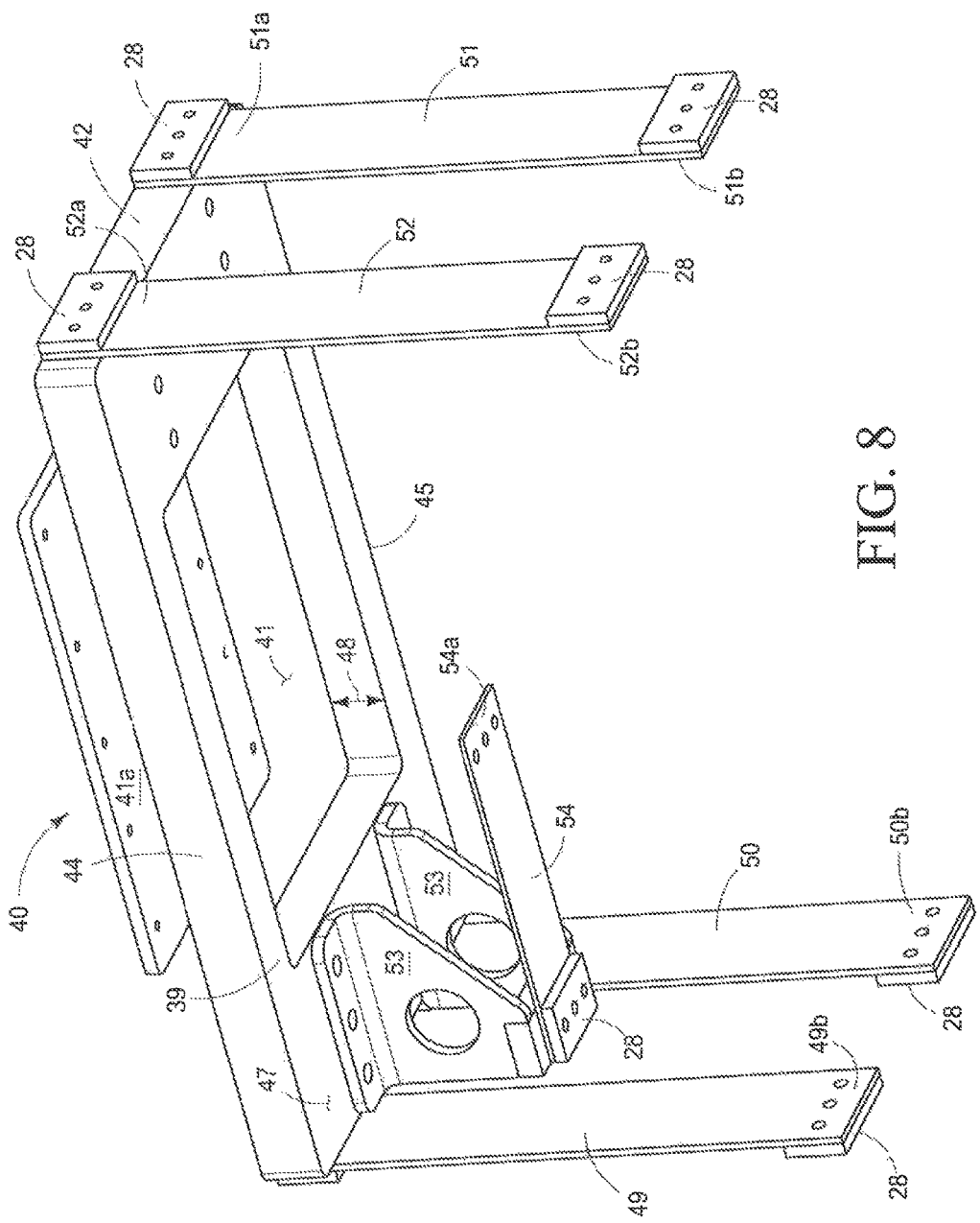
FIG. 8 is an isometric, bottom view of the counterweight of FIG. 7.

Referring now to FIGS. 7 and 8, a drive frame 53 which is formed of plural interconnected beams and struts is carried on the bottom 47 of the slab weight frame 39. The drive frame 53 is located proximate the second end 43, and generally centrally between the first side 44 and the second side 45. The drive frame 53 carries a flexible drive member 54 that interconnects with, or is coupled with, the eccentric drive unit 300, and will be discussed in greater detail, hereinafter. The drive member 54 has a first end portion 54a which is located proximate to the first end portion 42, and a second end portion 54b proximate to the second end 43.

The counter weight 40 is moveable along a reciprocal path of travel that is generally indicated by the numeral 56. (FIG. 15). The reciprocal path of travel 56 is defined between a first, forward oriented position 57, and a second, rearward oriented position 58. The repeated reciprocal motion of the counter weight 40 as will be described, hereinafter, provides an assortment of operational characteristics for the elongated conveyor bed 60.

The drive assembly 79 (FIGS. 9-13) includes various interconnected subassemblies, all of which will be described in detail. Generally speaking, the drive assembly 79 is supported by the stationary base 200, and is further oriented and operationally coupled in force transmitting relation relative to the elongated conveyor bed 60, and to the counterweight 40, so as to impart predetermined reciprocal motion to the same to achieve the benefits of the present invention 10. The major subassemblies of the drive assembly 79 are a powering unit 70; the vertical motor mount 215; the pivot axle 220 which is supported by the stationary base 200; and an eccentric drive unit 300.

Figure 10:
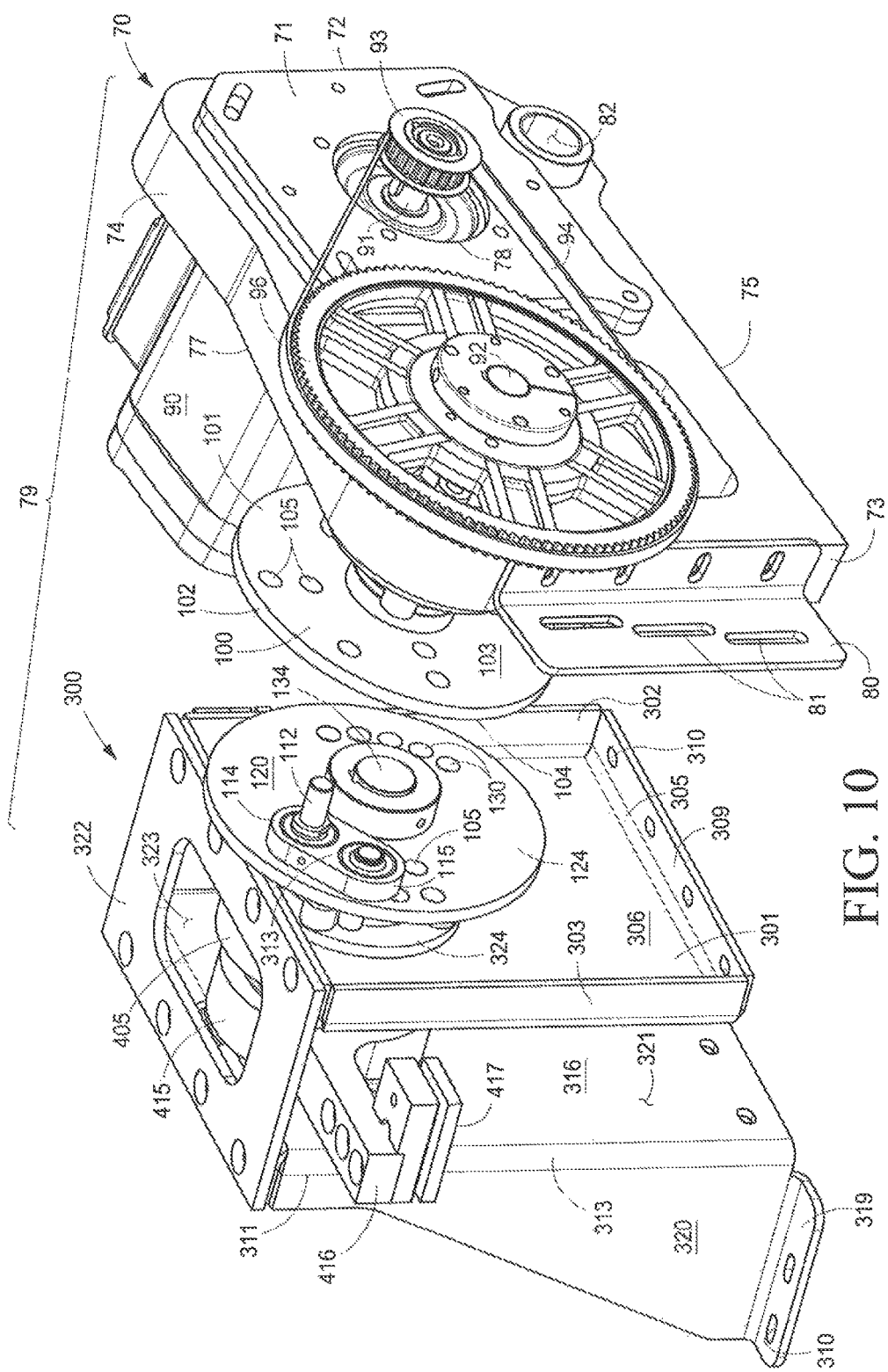
FIG. 10 is an exploded, isometric top view of the drive assembly of FIG. 9 and showing a powering unit separated from an eccentric drive unit.

The powering unit 70 generally provides a selectively energizable motor 90, which is mounted on a housing 71. The powering unit further includes an endless drive belt 94 and a drive wheel 96. As shown in FIG. 10, the housing 71 is somewhat generally rectilinear in configuration and further has a first end 72; a second end 73; a top 74; a bottom 75; a first side 76; and a second side 77. The housing 71 fixedly carries the selectively energizable motor 90 on the second side 77. The selectively energizable motor 90 further has an output shaft 91 which extends transversely through a shaft orifice 78, and which is defined in the housing 71 so that the output shaft 91 extends transversely through the housing 71 and perpendicularly outwardly from the first side 76 thereof.

A drive pulley, or shim 93 carried on the output shaft 92 and frictionally engages the endless drive belt 94 which communicates force to the drive wheel 96 so as to transfer rotational motion of the output shaft 91 thereto. The drive wheel 96 is carried on, or positioned on the first side 76 of the housing 71, and on a first axle 92, The first axle 71 is journaled in bearings (not shown), and a bearing block (not shown), and is carried by the housing 71 and is further spaced apart from the drive pulley 93. The drive wheel 96 has a diameter larger than a diameter of the drive pulley 93 so as to function as a reduction gear. As is known to those who are skilled in the art, varying the diameter of the drive pulley 93 and/or the diameter of the drive wheel 96 will vary the rotational ratio of the drive pulley 93 relative to the drive wheel 96 so to increase and/or decrease the rotational speed thereof. A pivot axle aperture or hole 82 is defined by the housing 71, and is located adjacent to the first end 72, and the bottom 75. The aperture 82 extends transversely through the housing 71. The pivot axle aperture 82 axially receives the pivot axle 220 and which is carried by the stationary base 200 so that the drive unit 70 and its attached components may pivot and move along a radial arc 83 relative to the pivot axle 220. (FIG. 15).

A mounting flange 80 is carried at the second end of the housing 71, The mounting flange 80 defines a plurality of vertically elongated holes 81 for receiving fasteners (not shown). The fasteners secure the mounting flange 80 to the vertical motor mount 215. The vertically elongated holes 81 permit the drive unit 70, and its attached components to be adjustably positioned relative to the vertical motor mount 215, as the drive unit 70 is pivoted about the pivot axle 220. The pivoting of the drive unit 70 about the pivot axle 220 causes the powering unit 70 to move along the radial arc identified as 83. (FIG. 15).

Those skilled in the art will recognize that the movement of the powering unit 70 about the radial arc 83 will add both a vertical component of movement, as well as a horizontal component of movement to the powering unit 70. This rotational movement has some tendency to reduce any vertical component of movement of the invention 10 during operation as the respective spring legs 21, 22, 23, 24 move in unison.

One skilled in the art will recognize that the powering unit 70 may be rendered selectively moveable along the radial arc 83 by employing any number of other assemblies including all manner of pneumatic or hydraulic pistons, gear drives, jackscrews and the like, and which can be selectively electrically or mechanically controlled so as to achieve the numerous benefits of the present invention. Such a moving means is generally identified as element 85. (FIG. 15).

The operable coupling of the output shaft 91 to the first axle 92 may be done by conventional means, that is, by belt, sprocket and chain, or direct coupling to the first axle 92 to effect the rotation of the first axle 92 in a given rotational direction. Again, the selectively energizable motor 90 may be coupled to suitable electronic controls (not shown) to effect the selective energizing of the motor 90 to initiate and stop the operation of the present invention 10, or further to selectively move the powering unit 70 to given operational locations along the radial arc 83 and which achieves the benefits of the invention which are disclosed.

Referring now to FIG. 10, and mounted on the end of the first axle 92, and located opposite the drive plate 96, is a first drive plate 100 which functions as a first eccentric weight. The first drive wheel 100 has a substantially circular main body 101 which is defined by a peripheral edge 102. The circular main body 101 has a first outwardly facing surface 103; and an opposite, second inwardly facing surface 104. An axle aperture (not shown) is formed substantially centrally thereof, and is operable to mateingly couple to one end of the first axle 92, and which is located opposite to the drive wheel 96.

The first drive plate 100 (FIGS. 9, 10) has a multiplicity of through holes or apertures 105 which are formed in a given pattern therein. The area of the first drive plate 100 which is located opposite the plurality of through holes or apertures 105 defines, in part, an eccentrically weighted region, or portion of the first drive plate 100. In a position located opposite to the eccentrically weighted portion, the first eccentric weight 100 includes a coupling post 112 and which is located near the peripheral edge 102, and which further extends normally outwardly therefrom. The coupling post 112 may be positionally adjusted by matingly cooperating with one of the plurality of holes or apertures 105. This arrangement provides further adjustability to the instant invention 10. The coupling post 112 is operable to rotatably engage and cooperate with a drive link 113. The drive link 113 has a first end 114 which rotatably engages or couples to the coupling post 112, and an opposite second end 115 which rotatably couples with a second drive plate 120 and which is carried by the eccentric drive unit 300, and which is discussed in the paragraphs which follow.

Figure 11:
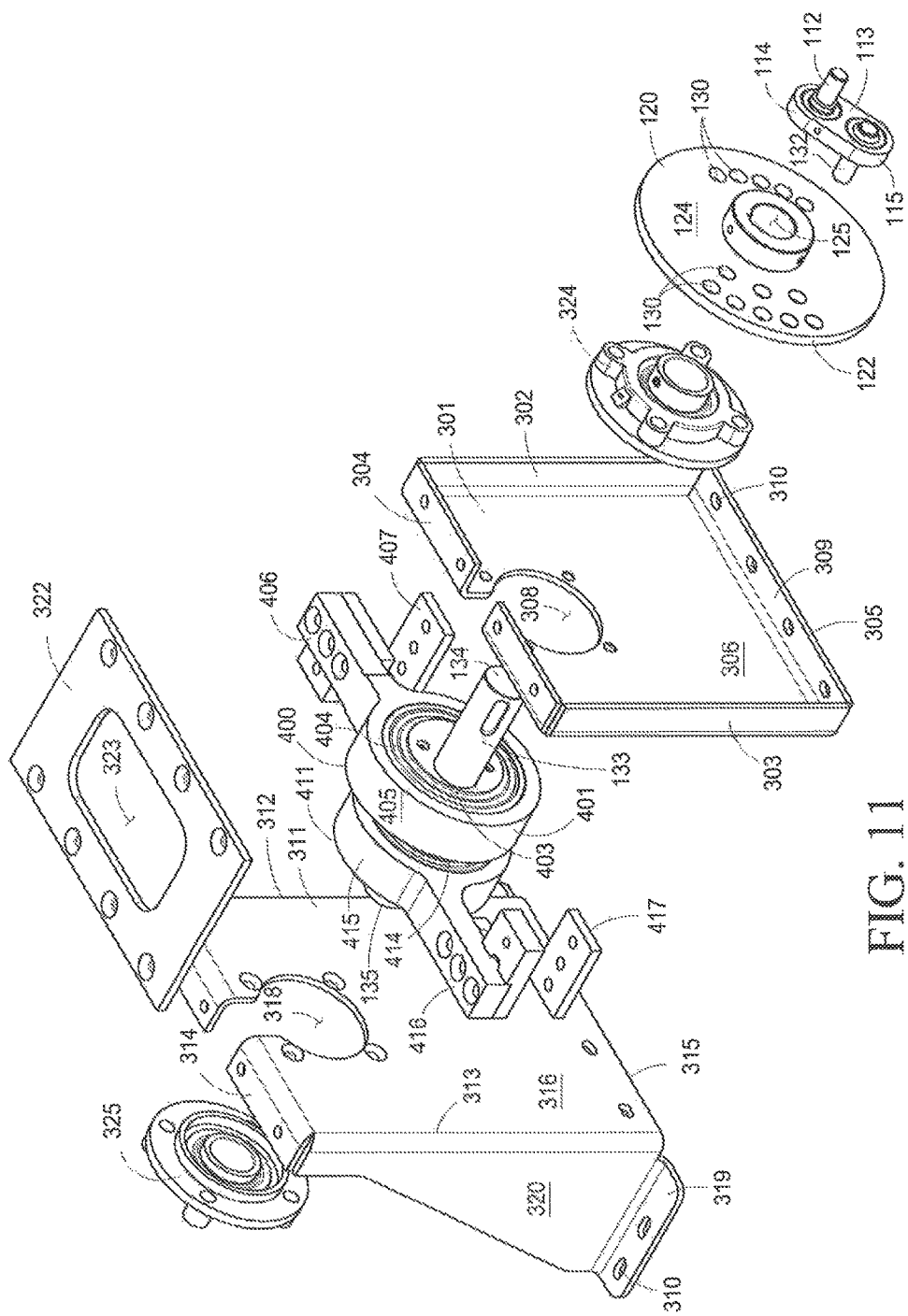
FIG. 11 is an isometric, exploded view of the eccentric drive unit as seen in FIG. 10.
Figure 12:
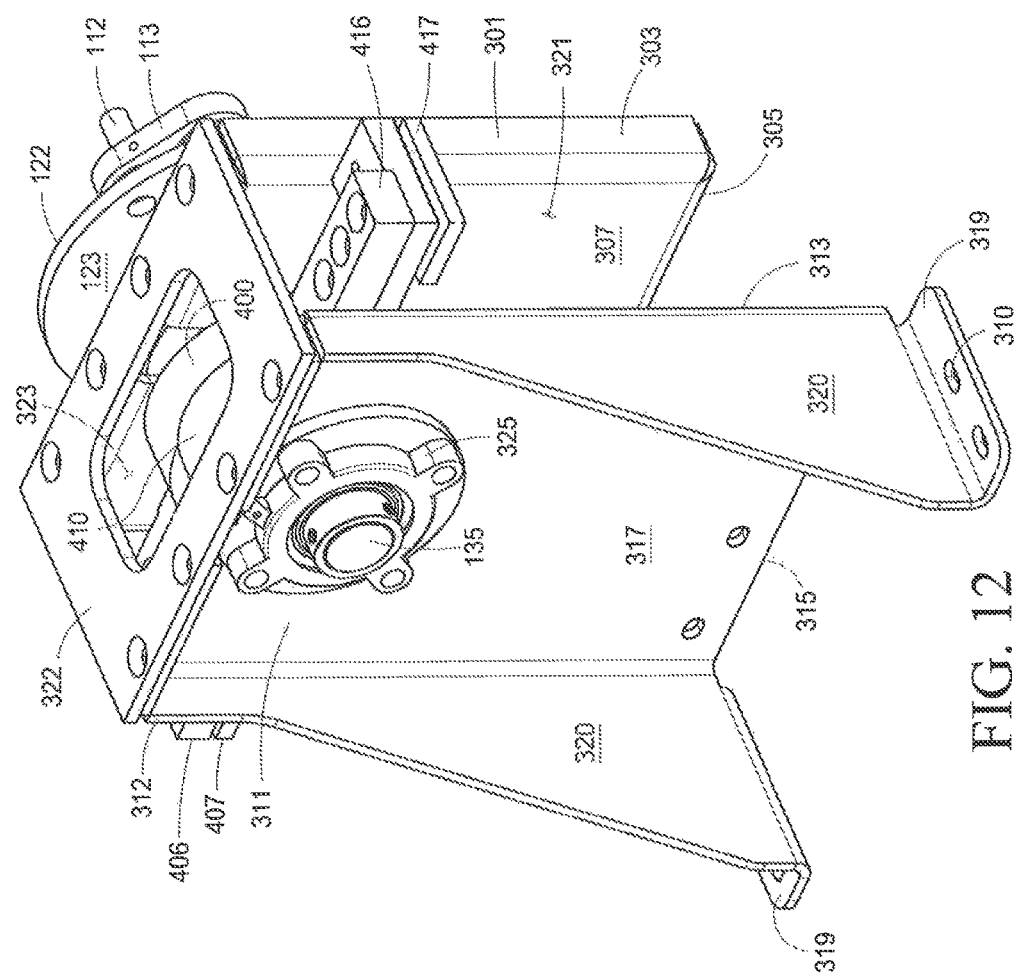
FIG. 12 is an isometric, top side elevation view of the eccentric drive unit.
Figure 13:
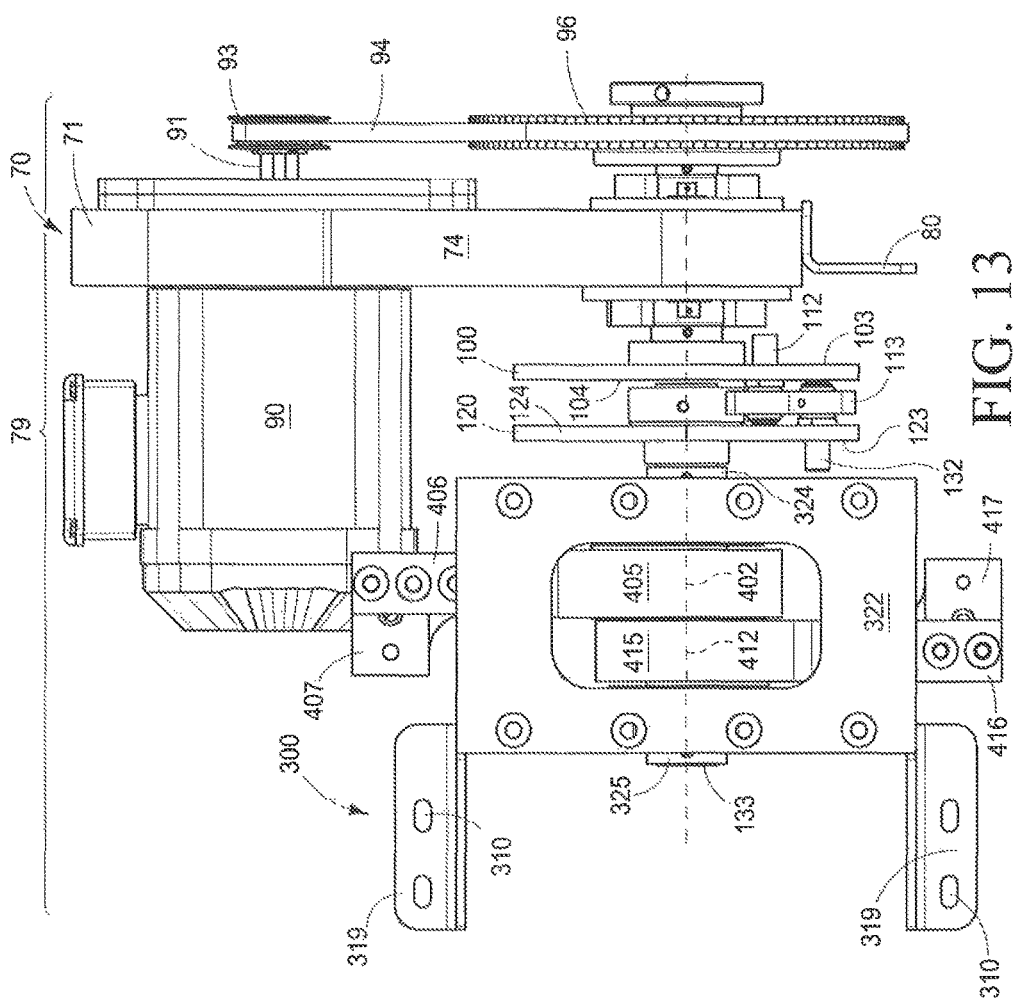
FIG. 13 is a top plan view of the drive assembly as seen in FIG. 9.

As shown in FIGS. 11, 12 and 13 the eccentric drive unit 300 comprises a generally hollow frame. The eccentric drive unit 300 has a first frame member 301; a second frame member 311; and a top member 322. The first frame member 301 has a first end 302; a second end 303; a top 304; a bottom 305; a first side 306; a second side 307. The first frame member 301 defines an axle hole 308 which communicates between the first side 306 and the second side 307. A perpendicularly extending flange 309 is carried along the peripheral edge and further defines a plurality of holes 310 for carrying or receiving fasteners (not shown). These fasteners mount the first frame member 301 to the stationary base 200. The second frame member 311 similarly has a first end 312; a second end 313; a top 314; a bottom 315; a first side 316; a second side 317. The second side member 311 defines an axle hole 318 which communicates between the first side 316, and the second side 317. A perpendicularly extending flange 319 is carried along the peripheral edge and defines a plurality of holes 310 for carrying or receiving fasteners (not shown) so as to mount the second frame member 311 to the stationary base 200. As best seen in FIG. 10, the second frame member 311 has a pair of generally triangular shaped support legs 320 which individually extend perpendicularly outwardly from the second side 317, and from a location near the first end 312, and the second end 313 so as to provide lateral support when securing the eccentric drive unit 300 to the stationary base 200. The top frame member 322 defines a medially oriented orifice 323 and which communicates between the top portions 304, and 314 of the first and second frame members 301, and 311 respectively. The top frame member 322 positionally maintains the spaced relationship between the first and second frame members 301, and 311 relative to one another so that a channel 321 is maintained or defined therebetween. A bearing (not shown) and which is carried within a bearing block 324 (FIG. 11) is carried on the first side 306, of the first frame member 301, A similar bearing block 325 carrying a bearing (not shown) is carried on the second side 317 of the second frame member 311. The bearings (not shown) within the respective bearing blocks 324, and 325 journal, or rotatably support, a second axle 133 that extends transversely through the first and second members 301, and 311, and across the channel 321 which is defined by the frame members 301, 311. The second axle 133 carries the second drive plate 120 which functions as a second eccentric weight.

As best seen in FIGS. 10 and 11, the second drive plate 120 is similar to the first drive plate 100, and further includes a circular main body 121 which is defined by a peripheral edge 122, The circular main body 121 has a second inwardly facing surface 124 which is disposed in predetermined, spaced, substantially parallel relationship relative to the second inwardly facing surface 104 of the first drive plate 100. Still further, the main body 121 is defined by a first, outwardly facing surface 123. Similar to the first drive plate 100, the second drive plate 120 includes an axle aperture 125 which is formed substantially centrally thereof. Similar to that as earlier described, and discussed with respect to the first drive plate 100, a multiplicity of through holes 130 or apertures are formed in the circular main body 121 of the second drive plate 120. The multiplicity of through holes 130 provides a means for forming a weighted eccentric portion. A coupling post 132 is provided which is mounted on the second inwardly facing surface 124, and which is further directed, orientated, or extends in a direction towards the first drive plate 100. The coupling post 132 may be movably positioned within various of the plurality of through holes 130, as necessary, so as to achieve the objects of the present invention 10. The coupling post 132 is rotatably coupled to the second end 115 of the drive link 113. As will be recognized, the drive link 113 couples the first drive plate 100 in force transmitting relation relative to the second drive plate 120. The second axle 133 has a first, or proximal end 134 which is matingly received in the axle aperture 125, and which is defined in the second to drive plate 120. The second axle 133 further has a second or distal end 135 which is rotatably supported in a bearing (not shown) and which is supported in a bearing block 325, The bearing block 325 is carried by the second frame member 311 of the eccentric drive unit 300. (FIG. 11).

As best illustrated by FIG. 11, a first eccentric camming member 400 and a second eccentric camming member 410 are carried in predetermined, spaced relation along the second axle 133, and are further located within the channel 321. The respective camming members 400, 410 are located between the first frame member 301 and the second frame member 311, The camming members 400, 410 are similar in construction and configuration each having an eccentric body 401, and 411; a center axis 402, and 412; a radially offset axle aperture 403, (not shown) to receive the second axle 133; a cooperating bearing 404, and 414 and a coupling member defining an annulus 405, and 415. The coupling members each have a drive arm 406, 416 respectively. As is well recognized by those who are skilled in the art, the radially offset axle apertures 403, (not shown) of each eccentric camming member 400, 410, the bearings 404, 414 and the two coupling members 405, 415 convert the axial rotation of the second drive shaft 133 into reciprocal motion of the respective drive arms 406, 416.

As should be understood, the first drive arm 406 is coupled in force transmitting relation to the drive member 54 of the counterweight 40. In this arrangement, the force transmitted by the first drive arm 406 is effective in moving the counter-weight 40 along a reciprocal path of travel 56 (FIG. 15) so as to effect, at least in part, the motion of the product 15 along the product transporting surface 64 in a predetermined direction. Additionally, the second drive arm 416 is coupled in force transmitting relation to the drive member 12 of the elongated conveyor bed the 60. In this arrangement, force transmitted by the second drive arm 416 is effective in moving the elongated conveyor bed 60 along the reciprocal course of travel 27 between the first, forward position 25, and the second rearward position 26. (FIG. 15) As will be best recognized by a study of FIGS. 10 and 11, it will be understood that the first axle 92 and the second axle 133 are disposed in substantially parallel, spaced relation, and further will be oriented in a non-coaxial relationship one relative to the other when the powering unit 70 moves along with the radial arc 83. (FIG. 15). Still further, the first and second axles 92, 133 respectively are each disposed substantially transversely relative to the longitudinal axis 63 of the elongated conveyor bed 60. As will be recognized from a study of the drawings, the selective energizing of the electric motor 90 is effective in causing rotational movement of the first axle 92. This rotational motion of the first axle 92 is effective for rotating the first drive plate 100 in a given direction. The imparted rotational motion of the first drive plate 100, in turn, transmits force through the drive link 113. The force transmitted by the drive link 113 then imparts rotational movement to the second drive plate 120. Again, rotation of the second drive plate 120 is effective in causing a corresponding rotation of the second axle 133. In this arrangement, the corresponding rotation of the second axle 133 transmits force through the eccentric camming members 400, 410 and which are eccentrically mounted along the second axle 133. The rotation of the camming members 400, 410 is operable to cause a reciprocal, eccentric force to be transmitted by way of the drive arms 406, 416 respectively. The reciprocal force transmitted by the first drive arm 406 is effective in causing the counter-weight 40 to move in a reciprocating fashion along the course of travel 56. Further, the reciprocal force transmitted by drive arm 416 is effective in causing the elongated conveyor bed 60 to move in a reciprocating fashion along the course of travel 27. (FIG. 15) moreover, the rotation of the camming members 400, 410 along with the reciprocal motion of the counter weight 40, and reciprocal motion of the elongated conveyor bed 60 is effective so as to effect movement of product 15 along the product transporting surface 64 (FIG. 1) in the fashion which will be discussed in greater detail, hereinafter.

Figure 2:
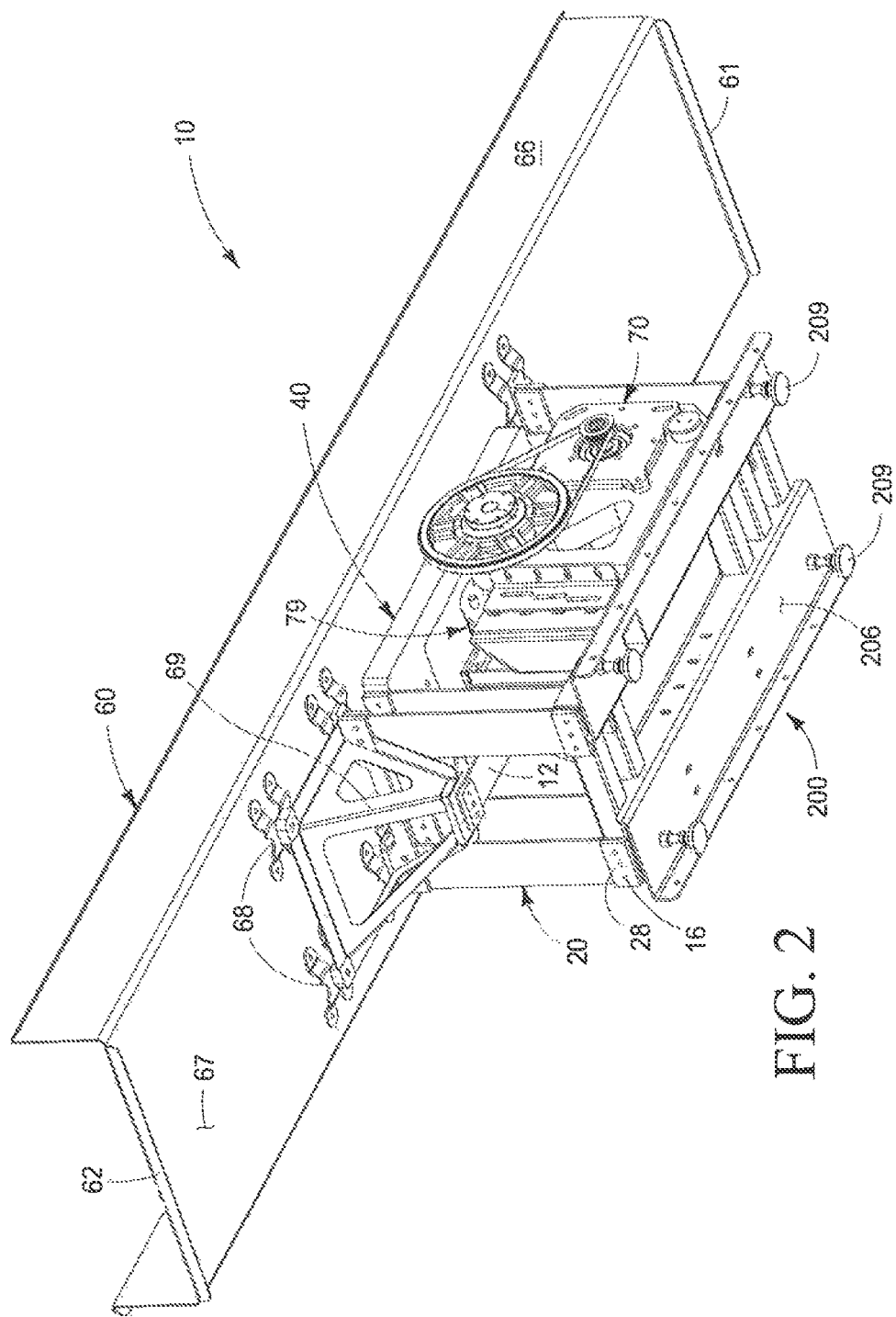
FIG. 2 is an isometric, bottom view of the improved linear motion conveyor of the present invention.

Referring now to FIGS. 1, 2 and 15, the elongated conveyor bed 60 is moveable along a reciprocal path of travel which is generally indicated by the numeral 27. This path of travel is defined between a first, forward position 25, and a second rearward position 26. In operation, the elongated conveyor bed, as a general matter, does not reciprocate at an equal velocity when moving in the direction of the first forward position 25, or in the second, rearward position 26. Those familiar in the art of linear conveyors will understand that the elongated conveyor bed 60 when moved in the direction of the first forward position 25, moves at a velocity and with a displacement which carries the product 15 in a forward direction at a first, predetermined speed or velocity. Then, the conveyor bed 60, when reversing direction, and moving in the second direction 26, moves at a velocity or speed which is higher than the predetermined first speed. Therefore, the product 15 is slowly advanced, and the bed 60 is then moved rapidly backwards so that the product 15 shuffles along the product transporting surface 64 when moving from one end to the other. It will be understood that the rotation of the pair of drive plates 100, and 120 and the eccentrics 400, 410 causes the elongated bed acceleration, movement and reversal of direction which determines the motion of the product 15. This is clearly set forth in the earlier parent patent application which is incorporated by reference herein. In this regard, the elongated conveyor bed 60 is rendered operable, in a first mode of operation, wherein the product 15 moves from the first end 61 to the second end 62 at a predetermined speed. Further, and in a second mode of operation, the elongated conveyor bed 60 can be rendered operable such that the product 15 may move in a direction from the second end 62 and towards the first end 61. Still further, and in a third possible mode of operation; the elongated conveyor bed 60 can be rendered operable such that the product 15 can substantially stop movement once it is located between the first and second ends 61 and 62 respectively of the product transporting surface 64. Additionally, it has been discovered that the present invention can move product 15 up an incline which has a pitch of less than about 7 degrees when measured from the horizontal plane.

To effect the several modes of operation of the elongated conveyor bed 60, the powering unit 70 which includes the selectively energizable electric motor 90; the housing 71; the endless drive belt 94; and the drive wheel 96 are pivoted on and about the pivot axle 220 which is carried by the stationary base 200 along the radial arc of travel 83. This arc of travel 83 is defined by a first position 87, (FIG. 15) and which positions the powering unit 70 in a given position which effects the first mode of operation of the elongated conveyor bed 60 moving product 15 from the first end 61 to the second end 62. Further, movement of the powering unit 70 to a second position 88 along the radial arc 83 is operable to effect the second mode of operation of the elongated conveyor bed 60 moving product 15 from the second end 62 to the first end 61. Still further, and when placed in an intermediate position 89, the powering unit 70 is operable to effect the third mode of operation of the elongated conveyor bed 60, and wherein product 15 remains a generally stationary on the product transporting surface 64. Again, as was discussed in the paragraphs above, and once energized, the electrically energizable motor 90 is effective in imparting physical force so as to cause a corresponding rotation of the first axle 92. Further, the rotation of the first axle 92 causes the first drive plate 100 to rotate. As earlier discussed, the drive link 113 is coupled to the first drive plate 100 and transmits power or physical force to the second drive plate 120 thereby causing the subsequent rotation of the second drive plate 120, and the second axle 133 which is coupled therewith. The rotation of the second axle 133 is effective in causing the reciprocal, and eccentric rotational motion of the respective eccentric caroming members 400, 410, and the associated drive arms 406, and 416. As earlier noted, one drive arm 416, as earlier described, causes force to be transmitted to the elongated conveyor bed 60, and generates reciprocal motion of the elongated conveyor bed 60 along the course of travel 27. (FIG. 15) This reciprocal motion of the elongated conveyor bed 60 takes place along the path of travel 27, and between the first and second positions 25 and 26, respectively, as discussed above, Simultaneously, the rotational movement of the second axle 133 is effective in causing the reciprocal motion of the counter weight 40 along the path of travel 56 between the first position 57, and the second position 58. This coordinated movement of the various assemblies, as well as the force generated by the rotation of the first and second drive plates 100, and 120 is effective in causing the product 15 to move along the product transporting surface 64, As noted in the paragraphs, above, the selective positioning of the powering unit 70 along the radial arc 83 is effective in causing the elongated conveyor bed 60 to operate in several modes of operation and which provides several novel features for the present invention 10. As will be recognized, the rotation of the powering unit 70 is effective in moving the selectively energizable motor 90 in a direction along the longitudinal axis 63 of the elongated conveyor bed 60.

Operation

The operation of the described embodiment of the present invention 10 is believed to be readily apparent and is briefly summarized at this point.

A first aspect of the present invention relates to a linear motion conveyor 10, which, in its broadest aspect, includes an elongated conveyor bed 60 having opposite first and second ends 61 and 62, and a longitudinal axis 63, and wherein the elongated conveyor bed 60 further has a product transporting surface 64 which supports a product 15 for movement between the first and second ends 61 and 62, respectively of the elongated conveyor bed. Further, and in its broadest aspect, the present invention 10 includes a drive assembly 79 which is oriented in predetermined force transmitting relation relative to the elongated conveyor bed 60, and which, when energized, imparts reciprocal motion to the elongated conveyor bed 60 to effect the selective movement of the product 15 along the product transporting surface 64 in a first direction which extends between the first and second ends 61 and 62 of the product transporting surface 64; a second direction which extends from the second end 62, to the first end 61 of the product transporting surface 64; and which further substantially stops the movement of the product 15 which is located between the first and second ends 61/62 of the elongated conveyor bed 60, all without de-energizing the drive assembly 79.

The drive assembly 79 imparts reciprocal motion to the elongated conveyor bed 60 which has first and second movement components 191, and 192, respectively. (FIG. 15). The first movement component 191 carries the elongated conveyor bed 60 in a first direction, and at a first predetermined speed. Further, the second movement component 192 carries the elongated conveyor bed 60 in a second direction, which is opposite to the first direction, and at a second predetermined speed which is faster than the first predetermined speed. This is illustrated in FIG. 15 by means of the arrows 191 and 192, respectively, and wherein the longer length arrow 191, depicts a slower velocity of the elongated conveyor bed 60, and the shorter length arrow 192 depicts a higher velocity of the of the elongated conveyor bed 60 in a direction opposite to arrow 191, In the arrangement as seen in the drawings, the product transporting surface 64 is depicted as substantially horizontally oriented. However, in an alternative forma of the invention, the product transporting surface 64 is non-horizontally oriented, and could be located at an angle of less than about 7 degrees from the horizontal. In the arrangement as seen in the drawings, the improved linear motion conveyor 10, as described, and more specifically the elongated conveyor bed 60 thereof reciprocates at a frequency of less than about 325 cycles per minute; achieves an elongated bed displacement of less than about 2.0 inches; and further has an elongated bed acceleration which is imparted to the product 15 being transported of less than about 147 feet per second$^2$.

A further aspect of the present invention relates to an improved linear motion conveyor which includes an elongated conveyor bed 60 having opposite first and second ends 61 and 62, and a product transporting surface 64 which supports a product 15 for movement between the first and second ends 61 and 62 thereof. A stationary base 200 is borne by a supporting surface 11 and to which is fixedly attached a translation frame assembly 20 which carries the elongated conveyor bed 60. The translation frame assembly 20 renders the elongated conveyor bed 60 reciprocally moveable relative to the stationary base 200. The reciprocal movement of the elongated conveyor bed 60 effects the movement of the product 15 along the product transporting surface 64. A drive assembly 79 is coupled in force transmitting relation relative to the elongated conveyor bed 60, and which, when energized, transmits force to the elongated conveyor bed 60, to reciprocally rock the elongated conveyor bed 60, and which is supported by upon the frame assembly 20, in opposite directions of movement. This movement is effective in imparting movement to the product 15 along the product transporting surface 64. The drive unit 70 of the drive assembly 79, when energized, is selectively positionally adjustable so as to cause the product 15 to move in a first direction, from the first to the second ends 61 and 62, respectively; a second direction, from the second end 62, and in the direction of the first end 61; and to further substantially prohibit the movement of the product 15 between the first and second ends 61, 62 of the product transporting surface 64.

The frame 20 has a first spring leg 21 and a second spring leg 22 which individually support the first end 61 of the elongated conveyor bed 60; and a third spring leg 23 and a fourth spring leg 24 which individually support the second end 62 of the elongated conveyor bed 60. Each of the four spring legs 21, 22, 23, 24 have a lower/bottom end portion 21b, 22b, 23b, 24b which is fixedly attached to the stationary base 200, and an opposite upper/top end 21a, 22a, 23a, 24a which is fixedly attached to the elongated conveyor bed 60. The drive assembly 79 is located vertically below the elongated conveyor bed 60 and between the first and second spring legs 21, 22 respectively, and the third and fourth spring legs 23, 24 respectively. As seen in the drawings, a reciprocally moveable counter-weight 40 is carried vertically above the drive assembly 79, and vertically below a medial portion of the elongated conveyor bed 60. The vertical alignment of the stationary base, the drive assembly 79; counterweight 40; and the center of the elongated conveyor bed 60 essentially becomes the center of mass 13, of the invention 10, and reduces the overall "footprint" of the invention 10. Further, bringing the "center of mass" 13 of the invention 10 closer to the powering unit 70 reduces the amount of radial movement required for the powering unit 70 along the radial arc of movement 83 to effectuate the novel objectives of the instant invention, namely the changing of directions of product 15 movement on the product transporting surface 64. As noted earlier, the radial movement causes the simultaneous movement of the selectively energizable motor 90 along the longitudinal axis 63 of the elongated conveyor bed 60.

The improved linear motion conveyor 10 of the present invention further includes a first drive arm 406 which is borne by the drive assembly 79, and which is coupled in force transmitting relation to the drive member 54 of the reciprocally moveable counter-weight 40. Further, the linear motion conveyor 10 includes a second drive arm 416 which is borne by the drive assembly 79, and which is further coupled in force transmitting relation to the drive member 12 of the elongated conveyor bed 60. The second drive arm 416 is operable to impart reciprocal motion to the elongated conveyor bed 60 when the drive assembly 79 is energized.

The elongated conveyor bed 60 has a longitudinal axis 63 which extends between the first and second ends 61/62, thereof. The powering unit 70 is selectively movable along an arcuate radial path of travel 83 which is located in predetermined, spaced relation relative to the pivot axle 220. The arcuate path of travel 83 of the powering unit 70 (which moves also along the longitudinal axis 63) has a first operational position 87 along the arcuate path of travel 83, and which causes the elongated conveyor bed 60 to reciprocate such that the product transporting surface 64 moves the product 15 in a direction extending from the first end 61 to the second end 62 of the elongated conveyor bed 60; a second operational position 88, along the arcuate path of travel 180, and which causes the product transporting surface 64 to move the product 15 in a direction extending from the second end 62 of elongated conveyor bed 60 to the first end 61 thereof; and a third operational position 89, which causes the product transporting surface 64 of the elongated conveyor bed 60 to substantially stop the movement of the product 15 along the product transporting surface 64. This arcuate path of travel 180 is typically less than about 5 inches along the arc 83.

The improved linear motion conveyor which includes the drive assembly 79 includes, at least in part, a vertical motor mount 215, a pivot axle 220, a housing 71, and a selectively energizable motor 90 which is carried by the housing 71 and pivotal about the pivot axle 220. The selectively energizable motor 90, as noted earlier also moves along the longitudinal axis 63. The selectively energizable motor 90 has an output shaft 91. The drive assembly 79 further includes a first axle 92 which is mounted below the elongated conveyor bed 60, and in a substantially horizontal orientation, and transversely relative to the longitudinal axis 63 of the elongated conveyor bed 60. The output shaft 91, of the motor 90 is coupled in rotatable, driving relation relative to the first axle 92, and is operable to impart rotational movement to the first axle 92. A first drive plate 100 is mounted on the first axle 92, and which is co-rotatable therewith. The first drive plate 100 has a first outwardly facing surface 103, and a second inwardly facing surface 104. A second drive plate 120 is provided, and which is mounted on a first proximal end 134 of the second axle 133, and which is co-rotatable therewith. The second drive plate 120 has a first outwardly facing surface 123, and a second inwardly facing surface 124. A drive link 113 forcibly couples the first and second drive plates 100/120 together. Upon energizing the selectively energizable motor 90 the subsequent rotation of the first drive plate 100 is operable to transmit force by way of the drive link 113 so as to facilitate a subsequent rotation of the second, drive plate 120, and the second axle 133. The rotation of the second axle 133 imparts reciprocal, eccentric force to the first and second drive arms 406, 416 so as to cause the predetermined reciprocal motion of the counterweight 40, and predetermined reciprocal motion of elongated conveyor bed 60. The counter weight 40 has a slab weight 41 which is about 80% to about 120% of the weight of the elongated conveyor bed 60. These coordinated reciprocal motions of the respective elements, noted above, along with the individual forces exerted by the respective drive plates 100, and 120, respectively, effects the predetermined motion of the product 15 along the product transporting surface 64, as earlier described.

Therefore, it will be seen that the improved linear motion conveyor 10 of the present invention provides assorted advantages and novel features not present in devices of similar design. The present invention 10 provides a convenient means whereby, without deenergizing the drive assembly 79, an operator, on the one hand, can move product 15 in a given first direction between the first and second ends 61 and 62 of the elongated conveyor bed 60; or in still another possible operational mode, reverse direction of the product thereby causing the product to move from the second end 62 and in the direction of the first end 61 thereof, or in the alternative, stop the movement of product 15 at a location between the first and second ends 61, 62.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A linear motion conveyor for moving a product along a product transporting surface in a first direction or in an opposite second direction, the linear motion conveyor comprising:

a stationary base supporting an elongated reciprocally movable conveyor bed having a product transporting surface, and opposite first and second ends, and wherein the stationary base and a reciprocally movable counterweight are each supported on plural pairs of spring legs, the stationary base having opposing, spaced apart end portions, opposing, spaced apart sides, a top surface carrying a vertical motor mount and further carrying a pivot axle extending transversely to the vertical motor mount;

a drive assembly carried by the stationary base, and coupled in force transmitting relation relative to both the elongated, reciprocally movable conveyor bed, and the reciprocally movable counterweight to impart a predetermined reciprocal motion to both the conveyor bed, and the counterweight, the drive assembly having a powering unit, an eccentric drive and a drive link, and wherein the powering unit has a selectively energizable motor operably interconnected with a rotatable, first drive plate, and defining a pivot axle aperture in a powering unit housing for engagement with the transversely extending pivot axle so that the powering unit is pivotal, and selectively movable, along a predetermined arcuate path travel relative to the stationary base, and wherein the eccentric drive has a hollow frame fixedly attached to the stationary base top surface, and the hollow frame further journals a rotatable axle that carries a first and second, spaced apart, caroming member, and wherein each of the first and second camming members has a drive arm operatively communicating with either a conveyor bed drive member, or a counterweight drive member, and the journaled axle further carries a second drive plate at an end portion, thereof, and which is proximate to the powering unit; and wherein the drive link operatively and rotatably couples the first and second drive plates together so that rotation imparted to the first drive plate by the selective energizing of the motor imparts a simultaneous rotation of the second drive plate, and wherein rotation of the first and second drive plates creates a driving force which imparts a predetermined reciprocal motion to the elongated conveyor bed, and the counterweight, and a simultaneous movement of the product along the product supporting surface in a given direction between the first and second ends of the conveyor bed; and wherein the selective orientation of the pivotally movable powering unit in a predetermined first position along the predetermined arcuate path travel is effective in causing movement of the product resting on the product transporting surface from a first end of the elongated conveyor bed in a direction toward the second end thereof, and wherein the selective orientation of the pivotally movable powering unit in a second position along the predetermined arcuate path of travel is effective in causing movement of the product resting on the product transporting surface in a direction from the second end of the elongated conveyor bed, toward the first end thereof, and wherein a selective orientation of the pivotally movable powering unit in a third position along the predetermined arcuate path of travel is effective in stopping a movement of the product resting on the product transporting surface between the first and second ends of the elongated conveyor bed.

2. A linear motion conveyor as claimed in claim 1, and further comprising:
a frame which is supported by the stationary base, and wherein the frame has a plurality of spaced spring legs which support the elongated conveyor bed in a predetermined, spaced relation relative to the stationary base, and wherein the frame has a first and a second spring leg that movably support the first end of the elongated conveyor bed, and a third and fourth spring leg that moveably support the second end of the elongated conveyor bed, and wherein each of the aforementioned spring legs have a first end which is fixedly mounted on the stationary base; and an opposite second end which is fixedly mounted on the elongated conveyor bed, and wherein reciprocal movement of the elongated conveyor bed is facilitated by a back-and-forth flexing motion of the plurality of spring legs.

3. A linear motion conveyor as claimed in claim 2, and further comprising:
a counter-weight carried by the stationary base, and which is located vertically, below, the elongated conveyor bed, and between the two spring legs supporting the first end of the elongated conveyor bed, and the two spring legs supporting the second end of the elongated conveyor bed, and wherein the counter-weight has a plurality of spaced spring arms having a first end which is fixedly attached to the stationary base, and a second end which is fixedly attached to the counterweight; and
a drive member operatively communicating between the counterweight and the drive assembly to reciprocally move the counterweight along a course of travel.

4. A linear motion conveyor as claimed in claim 3, and wherein the elongated conveyor bed has a given weight, and wherein the counter-weight has a weight which is at least about 80% to about 120% of the weight of the elongated conveyor bed.

5. A linear motion conveyor as claimed in claim 3, and further comprising:
a first drive arm borne by the drive assembly, and which extends from the drive assembly, and is further drivingly coupled to the counter-weight, and wherein force applied by the drive assembly to the first drive arm imparts reciprocal motion to the counter-weight; and
a second drive arm borne by the drive assembly and which extends from the drive assembly, and is drivingly coupled to the elongated conveyor bed, and wherein force applied by the drive assembly to the second drive arm imparts reciprocal motion to the elongated conveyor bed.

6. A linear motion conveyor as claimed in claim 5, and wherein:
the selectively energizable motor has an output shaft operatively communicating with a first axle which is mounted below the elongated conveyor bed, and in a substantially horizontal orientation and transversely relative to the longitudinal axis of the elongated conveyor bed, and wherein the first axle carries a first drive plate, and wherein a second axle is located in a substantially parallel, non-coaxial orientation relative to the first axle, and wherein the second axle has a first end carrying a second drive plate, and an opposite second end, and wherein the first and second drive arms are eccentrically drivingly coupled to the second axle; and
a drive link coupling the first drive plate, and the second drive plate together, and wherein upon energizing the selectively energizable motor the subsequent rotation of the first drive plate is operable to transmit force through the drive link so as to facilitate a subsequent rotation of the second drive plate, and the second axle, which is coupled therewith, and wherein the rotation of the second axle imparts eccentric reciprocal force to the first and second drive arms so as to impart predetermined, reciprocal motion of the counter-weight, and the elongated conveyor bed.

7. A linear motion conveyor as claimed in claim 6, and wherein the first axle is simultaneously selectively moveable along an arcuate path of travel with the pivotal movement of the powering unit about the pivot axle so as to effect movement of the product in the first and second directions along the product transporting surface, and/or to substantially prohibit the movement of the product along the product transporting surface.

8. A linear motion conveyor as claimed in claim 7, and wherein the drive assembly imparts reciprocal motion to the elongated conveyor bed which has a first and second movement components, and wherein the first movement component carries the elongated conveyor bed in a first direction, and at a first predetermined velocity, and wherein the second movement component carries the elongated conveyor bed in a second direction, which is opposite to the first direction, and at a second predetermined velocity which is faster than the first predetermined speed.

9. A linear motion conveyor as claimed in claim 8, and wherein the respective first and second drive plates are located in a first predetermined rotational position, one relative to the other to effect the first movement component, and in a second, predetermined rotational position, one relative to the other, to effect the second movement component.

10. A linear motion conveyor as claimed in claim 9, and wherein the reciprocal motion of the counter-weight has a first and second movement components, and wherein the first movement component of the counter-weight carries the counter-weight in a first direction which is towards the drive assembly, and the second movement component of the counter-weight carries the counter-weight in a second direction which is away from the drive assembly, and wherein the first movement component of the counter-weight occurs substantially simultaneously as the first movement portion of the elongated conveyor bed carries the elongated conveyor bed in the first direction, and wherein the second movement component of the of the counter-weight occurs substantially simultaneously when the second movement component of the elongated conveyor bed carries the elongated conveyor bed in the second direction.

11. A linear motion conveyor bed as claimed in claim 1, and wherein product transporting surface is substantially horizontally oriented.

12. A linear motion conveyor as claimed in claim 1, and wherein the product transporting bed is non-horizontally oriented, and at an angle of not greater than about 7 degrees from the horizontal.

13. A linear motion conveyor as claimed in claim 10, and wherein the arcuate path of travel of the first axle moving in unison with the powering unit is less than about 5 inches.

14. A linear motion conveyor as claimed in claim 10, and wherein the respective first and second drive plates each have a substantially similar weight.

15. A linear motion conveyor as claimed in claim 10, and wherein the elongated conveyor bed reciprocates at a frequency of less than about 325 cycles; achieves an elongated bed displacement of less than about 2.0 inches; and further has an elongated bed acceleration which is imparted to the product being transported of less than about 147 ft./sec$^2$.

\* \* \* \* \*

UNITED STATES PATENT AND TRADEMARK OFFICE
CERTIFICATE OF CORRECTION

PATENT NO. : 9,776,805 B2  
APPLICATION NO. : 14/818129  
DATED : October 3, 2017  
INVENTOR(S) : Eugene Groenewald Page 1 of 1

It is certified that error appears in the above-identified patent and that said Letters Patent is hereby corrected as shown below:

In the Claims

Column 18: Line 12: Delete the words "stationary base" and insert the words --conveyor bed--.

Signed and Sealed this  
Twenty-second Day of October, 2019

Andrei Iancu  
*Director of the United States Patent and Trademark Office*